US011165359B2

(12) United States Patent
Kusama et al.

(10) Patent No.: US 11,165,359 B2
(45) Date of Patent: Nov. 2, 2021

(54) POWER CONVERSION SYSTEM CONFIGURED TO PERFORM POWER CONVERSION BETWEEN DIRECT CURRENT AND THREE-PHASE ALTERNATING CURRENT

(71) Applicant: Panasonic Intellectual Property Management Co., Ltd., Osaka (JP)

(72) Inventors: Fumito Kusama, Osaka (JP); Takaaki Norisada, Osaka (JP); Yutaka Kamon, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 39 days.

(21) Appl. No.: 16/608,132

(22) PCT Filed: Apr. 18, 2018

(86) PCT No.: PCT/JP2018/015948
§ 371 (c)(1),
(2) Date: Oct. 24, 2019

(87) PCT Pub. No.: WO2018/198893
PCT Pub. Date: Nov. 1, 2018

(65) Prior Publication Data
US 2020/0169177 A1 May 28, 2020

(30) Foreign Application Priority Data

Apr. 24, 2017 (JP) .............................. JP2017-085306
Apr. 26, 2017 (JP) .............................. JP2017-086775
Jan. 16, 2018 (JP) .............................. JP2018-005077

(51) Int. Cl.
*H02M 7/5387* (2007.01)
*H02M 1/12* (2006.01)
(Continued)

(52) U.S. Cl.
CPC ......... *H02M 3/33584* (2013.01); *H02M 1/12* (2013.01); *H02M 5/4585* (2013.01); *H02M 7/53871* (2013.01); *H02M 1/007* (2021.05)

(58) Field of Classification Search
CPC ........... H02M 7/5387; H02M 7/53871; H02M 1/126; H02M 2001/007; H02M 1/12
See application file for complete search history.

(56) References Cited

U.S. PATENT DOCUMENTS 9,318,976 B1* 4/2016 Wei .................... H03K 3/017
9,610,972 B2* 4/2017 Ajima .................... B62D 5/046
(Continued)

FOREIGN PATENT DOCUMENTS

JP 07-023505 * 1/1995
JP H07-23505 A 1/1995
(Continued)

OTHER PUBLICATIONS

International Search Report issued in corresponding International Patent Application No. PCT/JP2018/015948, dated Jul. 3, 2018, with English translation.

*Primary Examiner* — Sisay G Tiku
(74) *Attorney, Agent, or Firm* — McDermott Will & Emery LLP

(57) ABSTRACT

A power conversion system includes a converter circuit and a control circuit. The control circuit controls, through use of PWM signals, high potential-side switches for a U-phase circuit, a V-phase circuit, and a W-phase circuit, respectively. The control circuit alternately switches between a first modulation method and a second modulation method at each half carrier period of each of the PWM signals. In the first modulation method, the control circuit determines, as a first value, a duty ratio of the PWM signal for one of a U phase, a V phase, and a W phase that has a maximum phase voltage. In the second modulation method, the control circuit deter-
(Continued)

mines, as a second value, the duty ratio of the PWM signal for one of the U phase, the V phase, and the W phase that has a minimum phase voltage.

18 Claims, 9 Drawing Sheets

(51) Int. Cl.
    *H02M 3/335*    (2006.01)
    *H02M 5/458*    (2006.01)
    *H02M 1/00*     (2006.01)

(56) References Cited

U.S. PATENT DOCUMENTS

| | | | |
|---|---|---|---|
| 10,541,638 B2 * | 1/2020 | Shouji | H02P 21/18 |
| 10,707,799 B2 * | 7/2020 | Ishizuka | H02P 27/08 |
| 2007/0216344 A1 * | 9/2007 | Welchko | H02P 27/04 |
| | | | 318/811 |
| 2008/0197902 A1 * | 8/2008 | Welchko | H02P 27/06 |
| | | | 327/175 |
| 2009/0069142 A1 * | 3/2009 | Welchko | B60L 50/61 |
| | | | 475/276 |
| 2009/0179608 A1 * | 7/2009 | Welchko | H02M 7/53875 |
| | | | 318/801 |
| 2015/0077025 A1 | 3/2015 | Suzuki | |
| 2015/0372598 A1 * | 12/2015 | Akiyama | H02M 1/14 |
| | | | 363/17 |
| 2016/0322890 A1 * | 11/2016 | Lee | H02M 7/44 |
| 2017/0019052 A1 | 1/2017 | Suzuki | |
| 2018/0175627 A1 * | 6/2018 | Woodburn | H02J 3/00 |
| 2019/0135330 A1 | 5/2019 | Suzuki | |
| 2019/0199235 A1 * | 6/2019 | Liu | H02M 7/53871 |
| 2019/0207527 A1 * | 7/2019 | Norisada | H02M 1/42 |
| 2019/0229646 A1 * | 7/2019 | Liu | H02M 7/5395 |

FOREIGN PATENT DOCUMENTS

| | | |
|---|---|---|
| JP | H08-322245 A | 12/1996 |
| JP | 2015-61379 A | 3/2015 |
| JP | 2017-028763 A | 2/2017 |
| WO | 2015/072036 A1 | 5/2015 |

* cited by examiner

POWER CONVERSION SYSTEM CONFIGURED TO PERFORM POWER CONVERSION BETWEEN DIRECT CURRENT AND THREE-PHASE ALTERNATING CURRENT

CROSS-REFERENCE OF RELATED APPLICATIONS

This application is the U.S. National Phase under 35 U.S.C. § 371 of International Patent Application No. PCT/JP2018/015948, filed on Apr. 18, 2018, which in turn claims the benefit of Japanese Application No. 2018-005077, filed Jan. 16, 2018, Japanese Application No. 2017-086775, filed Apr. 26, 2017, and Japanese Application No. 2017-085306, filed Apr. 24, 2017, the entire disclosures of which Applications are incorporated by reference herein.

TECHNICAL FIELD

This disclosure generally relates to a power conversion system, and more particularly, to a power conversion system configured to perform power conversion between a direct current and a three-phase alternating current.

BACKGROUND ART

In Patent Literature 1, there is described an insulated bidirectional step-up/step-down chopper circuit connected between a battery and an electric double-layer capacitor. The bidirectional step-up/step-down chopper circuit described in Patent Literature 1 includes a center-tapped transformer. A center tap of a primary winding of the transformer is connected to a positive side of the battery via a reactor, while two ends of the primary winding are connected to a negative side of the battery via respective step-up chopper elements. Meanwhile, a center tap of a secondary winding of the transformer is connected to one terminal of the electric double-layer capacitor, while two ends of the secondary winding are connected to another terminal of the electric double-layer capacitor via respective step-down chopper elements. In addition, a smoothing capacitor is connected between input terminals of the bidirectional step-up/step-down chopper circuit.

CITATION LIST

Patent Literature

Patent Literature 1: JP 07-23505 A

SUMMARY OF INVENTION

An object of this disclosure is to provide a power conversion system capable of reducing waveform distortion of an output waveform when power conversion between a direct current and a three-phase alternating current is performed.

A power conversion system according to an aspect of this disclosure is a power conversion system, which is configured to perform power conversion between a DC terminal and AC terminals, and includes a converter circuit and a control circuit. The DC terminal is electrically connected to a DC power source or a DC load. The AC terminals are electrically connected to a three-phase AC power source or a three-phase AC load having a U phase, a V phase, and a W phase. The converter circuit is electrically connected to the AC terminals. The converter circuit includes a high potential-side switch and a low potential-side switch, which are electrically connected in series, and includes a U-phase circuit, a V-phase circuit, and a W-phase circuit, which correspond to the U phase, the V phase, and the W phase in one-to-one correspondence, respectively. The control circuit is configured to control, for each of the U-phase circuit, the V-phase circuit, and the W-phase circuit, the high potential-side switch through use of a PWM signal. The control circuit alternately switches between a first modulation method and a second modulation method at each half carrier period of the PWM signal. In the first modulation method, the control circuit determines, as a first value, a duty ratio of the PWM signal for one of the U phase, the V phase, and the W phase that has a maximum phase voltage. In the second modulation method, the control circuit determines, as a second value, the duty ratio of the PWM signal for one of the U phase, the V phase, and the W phase that has a minimum phase voltage.

DESCRIPTION OF EMBODIMENTS

First Embodiment

(1) Outline

Figure 1:
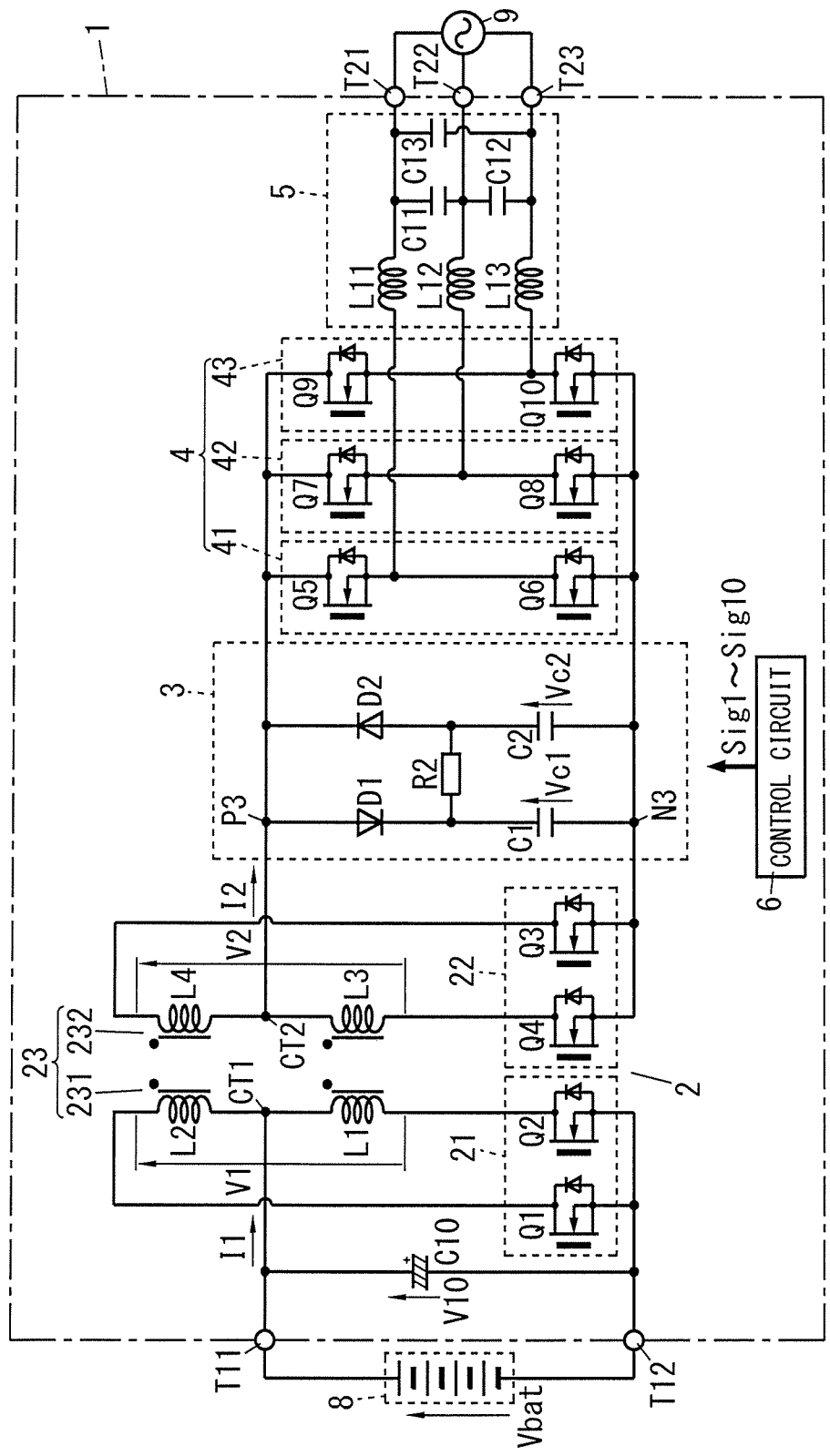
FIG. 1 is a circuit diagram for illustrating a schematic configuration of a power conversion system according to a first embodiment of this disclosure.

As illustrated in FIG. 1, a power conversion system 1 according to a first embodiment of this disclosure is a system configured to perform power conversion between DC terminals T11 and T12 and AC terminals T21, T22, and T23. To the DC terminals T11 and T12, a storage battery 8 is electrically connected. To the AC terminals T21, T22, and T23, a power system 9 is electrically connected. The "power system" mentioned in this disclosure indicates an entire system for an electric supplier, for example, an electric company, to supply electric power to power receiving facilities of consumers.

The power conversion system 1 according to the first embodiment converts DC power input thereto from the storage battery 8 into three-phase AC power having a U phase, a V phase, and a W phase, and outputs (transfers) the AC power to the power system 9. The power conversion system 1 also converts the three-phase AC power having the U phase, the V phase, and the W phase input thereto from the power system 9 into the DC power, and outputs the DC power to the storage battery 8. That is, the power conversion system 1 performs bidirectional power conversion between the DC terminals T11 and T12 and the AC terminals T21, T22, and T23.

In other words, when the storage battery 8 is discharged, the power conversion system 1 converts the DC power input thereto from the storage battery 8 into the AC power and outputs (discharges) the AC power to the power system 9. At this time, the storage battery 8 functions as a "DC power source", while the power system 9 functions as a "three-phase AC load" having the U phase, the V phase, and the W phase. When the storage battery 8 is charged, the power conversion system 1 converts the AC power input thereto from the power system 9 into the DC power and outputs the DC power to the storage battery 8 (charges the storage battery 8 with the DC power). In this state, the storage battery 8 functions as a "DC load", while the power system 9 functions as a "three-phase AC power source" having the U-phase, the V-phase, and the W-phase.

As illustrated in FIG. 1, the power conversion system 1 according to the first embodiment includes a converter circuit 4 electrically connected to the AC terminals T21, T22, and T23, and a control circuit 6. The converter circuit 4 includes a U-phase circuit 41, a V-phase circuit 42, and a W-phase circuit 43, which correspond to the U phase, the V phase, and the W phase, respectively, in one-to-one correspondence. The U-phase circuit 41, the V-phase circuit 42, and the W-phase circuit 43 include respective high potential-side switches Q5, Q7, and Q9 and respective low potential-side switches Q6, Q8, and Q10, wherein the high potential-side switch and the low potential-side switch of each phase circuit are electrically connected in series. The control circuit 6 controls, for the U-phase circuit 41, the V-phase circuit 42, and the W-phase circuit 43, the high potential-side switches Q5, Q7, and Q9 using pulse width modulation (PWM) signals, respectively.

The control circuit 6 alternately switches between a first modulation method and a second modulation method at each half carrier period of the PWM signals. In the first modulation method, the control circuit 6 determines, as a first value, a duty ratio of the PWM signal for one of the U phase, the V phase, and the W phase that has a maximum phase voltage. In the second modulation method, the control circuit 6 determines, as a second value, the duty ratio of the PWM signal for one of the U phase, the V phase, and the W phase that has a minimum phase voltage.

The "half carrier period of the PWM signals" mentioned in this disclosure indicates a half of a carrier period of each of the PWM signals, that is, a period corresponding to half a period of a carrier signal for PWM control. For example, when the control circuit generates the PWM signals using a carrier signal in the form of a triangular wave, a time interval between maximum values (or minimum values) of the carrier signal corresponds to one period of the carrier signal, and half the time interval corresponds to the half carrier period. When the control circuit generates the PWM signals using the carrier signal in the form of a sawtooth wave, a time interval between the minimum value and the maximum value of the carrier signal corresponds to one period of the carrier signal, and half the time interval corresponds to the half carrier period.

The "duty ratio" mentioned in this disclosure refers to a ratio of a period during which the PWM signal has an active value to the half carrier period of the PWM signal (half the period of the carrier signal), in a case where the PWM signal is a binary signal which alternately switches between the active value and a non-active value. It is assumed herein that the high potential-side switches Q5, Q7, and Q9 controlled by the PWM signals are turned ON when the PWM signals have the active values. In other words, the duty ratio corresponds to a ratio of an ON period of each of the high potential-side switches Q5, Q7, and Q9 to the half carrier period. It is assumed below that a value of the duty ratio varies in a range between "0" (substantially 0%) as a minimum value and "1" (substantially 100%) as a maximum value. The "substantially 100%" indicates that a ratio of the ON period of each of the high potential-side switches Q5, Q7, and Q9 to a period obtained by subtracting an inversion period Td1 (see FIG. 5) from the half carrier period is approximately 100%. The same applies also to the "substantially 0%".

As described above, the power conversion system 1 according to the first embodiment uses a modulation (hereinafter referred to also as "inter-AC-line modulation") method of alternately switching between the first modulation method and the second modulation method at each half carrier period of the PWM signals. Accordingly, a period during which the duty ratio of the PWM signal for one of the U phase, the V phase, and the W phase that has the maximum phase voltage is fixedly determined and a period during which the duty ratio of the PWM signal for one of the U phase, the V phase, and the W phase that has the minimum phase voltage is fixedly determined repeatedly alternate at each half carrier period. By controlling the converter circuit 4 using such a modulation method, the power conversion system 1 can reduce waveform distortion of an output waveform when power conversion between a direct current and a three-phase alternating current is performed.

By way of example, in the first embodiment, a description is given on the assumption that an electricity storage system including the power conversion system 1 and the storage battery 8 is introduced into a non-residential facility such as an office building, a hospital, a commercial facility, or a school.

Particularly in recent years, there has been expanding "electric power selling", in which a corporation or an individual reversely distributes electric power obtained from a distributed power source (for example, a solar battery, a storage battery, or a fuel battery) to a commercial power system. The electric power selling is achieved by power system interconnection in which a distributed power source and a commercial power system are connected. In the power system interconnection, the power conversion system 1 referred to as "power conditioner" is used to convert power from the distributed power source to power appropriate for the commercial power system. By way of example, the power conversion system 1 according to the first embodiment is used as the power conditioner to convert DC power and three-phase AC power to each other between the storage battery 8 serving as the distributed power source and the power system 9.

(2) Configuration

Referring to FIG. 1, a description is given below of a configuration of the power conversion system 1 according to the first embodiment.

As described above, the power conversion system 1 according to the first embodiment includes the converter circuit 4 and the control circuit 6. The power conversion system 1 is the system configured to perform power conversion between the two DC terminals T11 and T12 and the three AC terminals T21, T22, and T23. To the DC terminals T11 and T12, the storage battery 8 functioning as the DC power source or the DC load is electrically connected. To the AC terminals T21, T22, and T23, the power system 9 functioning as a three-phase AC power source or the three-phase AC load having the U phase, the V phase, and the W phase is electrically connected.

The power conversion system 1 further includes a first capacitor C10, a transformer circuit portion 2, a connection portion 3, and a filter circuit 5. The power conversion system 1 also includes the two DC terminals T11 and T12 and the three AC terminals T21, T22, and T23. However, the two DC terminals T11 and T12 and the three AC terminals T21, T22, and T23 may not be included in components of the power conversion system 1. A "terminal" mentioned in this disclosure may not be a component for connecting electric wires or the like. For example, the "terminal" may also be a lead of an electronic component, a portion of a conductor included in a circuit board, or the like.

The first capacitor C10 is electrically connected between the two DC terminals T11 and T12. In other words, the first capacitor C10 is connected to the storage battery 8 via the two DC terminals T11 and T12. For example, the first capacitor C10 is an electrolytic capacitor. The first capacitor C10 has a function of stabilizing a voltage between the DC terminals T11 and T12. A voltage across two terminals of the first capacitor C10 is hereinafter denoted by "V10".

For example, the transformer circuit portion 2 is a DC/DC converter. As illustrated in FIG. 1, the transformer circuit portion 2 includes a first converter portion 21, a second converter portion 22, and a transformer 23. The first converter portion 21 has a plurality of (two in the illustrated example) switching elements Q1 and Q2. The second converter portion 22 has a plurality of (two in the illustrated example) switching elements Q3 and Q4. The transformer 23 has a primary winding 231 and a secondary winding 232, which are magnetically coupled to each other. For example, each of the switching elements Q1 to Q4 is a depletion-type n-channel metal-oxide-semiconductor field effect transistor (MOSFET). Each of the switching elements Q1 to Q4 includes a parasitic diode. The respective parasitic diodes of the individual switching elements Q1 to Q4 have anodes electrically connected to respective sources of the corresponding switching elements Q1 to Q4, while having cathodes electrically connected to respective drains of the corresponding switching elements Q1 to Q4.

The primary winding 231 is electrically connected to the first capacitor C10 via the first converter portion 21. The secondary winding 232 is electrically connected to the connection portion 3 via the second converter portion 22. The control circuit 6 controls the first converter portion 21 and the second converter portion 22 of the transformer circuit portion 2.

In the example illustrated in FIG. 1, the storage battery 8 is electrically connected between the DC terminals T11 and T12 such that, of the two DC terminals T11 and T12, the DC terminal T11 is at a relatively high potential (positive electrode) and the DC terminal T12 is at a relatively low potential (negative electrode). To the AC terminals T21, T22, and T23, the power system 9 is electrically connected. The AC terminals T21, T22, and T23 are connected to the U phase, the V phase, and the W phase, respectively.

In other words, the transformer circuit portion 2 includes the primary and secondary windings 231 and 232 magnetically coupled to each other, the first converter portion 21, and the second converter portion 22. The first converter portion 21 is electrically connected between the DC terminal T12 and the primary winding 231. The second converter portion 22 is electrically connected to the secondary winding 232.

By way of example, the transformer 23 used herein is a center-tapped high-frequency insulated transformer. The primary winding 231 of the transformer 23 is formed of a series circuit including two windings L1 and L2 and using a primary center tap CT1 as a connection point. Likewise, the secondary winding 232 of the transformer 23 is formed of a series circuit including two windings L3 and L4 and using a secondary center tap CT2 as a connection point. In other words, the two windings L1 and L2 are electrically connected in series to form the primary winding 231. Likewise, the two windings L3 and L4 are electrically connected in series to form the secondary winding 232. The primary center tap CT1 is electrically connected to a positive-electrode terminal (closer to the DC terminal T11) of the first capacitor C10. The secondary center tap CT2 is electrically connected to a terminal P3 described later. For example, a ratio among the respective numbers of winding of the windings L1, L2, L3, and L4 is 1:1:1:1. The ratio among the respective numbers of winding of the windings L1, L2, L3, and L4 can freely be changed based on, for example, a specification of the power conversion system 1.

The first converter portion 21 is a high-frequency inverter configured to convert a DC voltage applied to the DC terminals T11 and T12 to, for example, a high-frequency AC voltage of 20 kHz in the form of a rectangular wave and supply the high-frequency AC voltage to the primary winding 231.

The switching element Q1 of the first converter portion 21 is electrically connected in series to the winding L2 between two terminals of the first capacitor C10. The switching element Q2 of the first converter portion 21 is electrically connected in series to the winding L1 between the two terminals of the first capacitor C10. In other words, between the DC terminals T11 and T12, a series circuit including the switching element Q1 and the winding L2 and a series circuit including the switching element Q2 and the winding L1 are electrically connected in parallel.

The drain of the switching element Q1 is electrically connected to the center tap CT1 of the primary winding 231 via the winding L2. The drain of the switching element Q2 is electrically connected to the center tap CT1 of the primary winding 231 via the winding L1. Each of the source of the switching element Q1 and the source of the switching element Q2 is electrically connected to the low potential-side (negative-electrode) DC terminal T12.

The second converter portion 22 converts an AC voltage in the form of a rectangular wave having positive and negative polarities and alternately supplied to the secondary winding 232 into a voltage having the positive polarity, and supplies the voltage having the positive polarity between the terminal P3 and a terminal N3 of the connection portion 3. The voltage is supplied herein between the terminals P3 and N3 such that, of the two terminals P3 and N3, the terminal P3 is at a relatively high potential (serves as a positive electrode) and the terminal N3 is at a relatively low potential (serves as a negative electrode).

The switching element Q3 of the second converter portion 22 is electrically connected in series to the winding L4 between the terminals P3 and N3 described later. The switching element Q4 of the second converter portion 22 is electrically connected in series to the winding L3 between the terminals P3 and N3. In other words, between the terminals P3 and N3, a series circuit including the switching element Q3 and the winding L4 and a series circuit including the switching element Q4 and the winding L3 are electrically connected in parallel.

The drain of the switching element Q3 is electrically connected to the center tap CT2 of the secondary winding 232 via the winding L4. The drain of the switching element Q4 is electrically connected to the center tap CT2 of the secondary winding 232 via the winding L3. Each of the source of the switching element Q3 and the source of the switching element Q4 is electrically connected to the low potential-side (negative-electrode) terminal N3.

Between the drain and the source of each of the switching elements Q1 and Q2, a capacitor may also be electrically connected. In this case, the capacitor resonates with the primary winding 231 to implement soft switching of the switching elements Q1 to Q4. The capacitor may also be electrically connected between the drain of the switching element Q1 and the drain of the switching element Q2, or may also be electrically connected in parallel to each of the windings L1 and L2.

As illustrated in FIG. 1, the connection portion 3 is electrically connected to the second winding 232 of the transformer 23 via the second converter portion 22. To the connection portion 3, the converter circuit 4 is also electrically connected. In other words, the connection portion 3 electrically connects the second converter portion 22 and the converter circuit 4. As described above, the connection portion 3 includes the terminal P3 (an example of a first connection terminal) and the terminal N3 (an example of a second connection terminal). The second converter portion 22 operates such that a voltage of the terminal P3 is positive with respect to that of the terminal N3, that is, a potential of the terminal P3 is relatively higher than that of the terminal N3.

The connection portion 3 has the two terminals P3 and N3 described above, a plurality of (two in the illustrated example) diodes D1 and D2, a resistor R2, and a plurality of (two in the illustrated example) second capacitors C1 and C2. The connection portion 3 is a snubber circuit electrically connected to the secondary winding 232. The diode D1 is electrically connected in series to the second capacitor C1 between the terminals P3 and N3. The diode D2 is electrically connected in series to the second capacitor C2 between the terminals P3 and N3. An anode of the diode D1 is electrically connected to the terminal P3, while a cathode of the diode D1 is electrically connected to the terminal N3 via the second capacitor C1. An anode of the diode D2 is electrically connected to the terminal N3 via the second capacitor C2, while a cathode of the diode D2 is electrically connected to the terminal P3. In other words, the diode D1 and the diode D2 are connected between the terminals P3 and N3 to face opposite directions. The resistor R2 is electrically connected between a connection point between the diode D1 and the second capacitor C1 and a connection point between the diode D2 and the second capacitor C2.

The converter circuit 4 is a three-phase inverter circuit having the U-phase circuit 41, the V-phase circuit 42, and the W-phase circuit 43. The U-phase circuit 41, the V-phase circuit 42, and the W-phase circuit 43 correspond to the U phase, the V phase, and the W phase in one-to-one correspondence. The U-phase circuit 41 corresponding to the U-phase includes the high potential-side switch Q5 and the low potential-side switch Q6, which are electrically connected in series. The V-phase circuit 42 corresponding to the V-phase includes the high potential-side switch Q7 and the low potential-side switch Q8, which are electrically connected in series. The W-phase circuit 43 corresponding to the W-phase includes the high potential-side switch Q9 and the low potential-side switch Q10, which are electrically connected in series. Thus, the converter circuit 4 has the plurality of (six in FIG. 1) bridge-connected switching elements functioning as the high potential-side switches Q5, Q7, and Q9 and the low potential-side switches Q6, Q8, and Q10. The high potential-side switches Q5, Q7, and Q9 and the low potential-side switches Q6, Q8, and Q10 may be referred to also as "switching elements Q5 to Q10".

For example, each of the switching elements Q5 to Q10 is a depletion-type n-channel MOSFET. The switching element Q5 is electrically connected in series to the switching element Q6 between the terminals P3 and N3. The switching element Q7 is electrically connected in series to the switching element Q8 between the terminals P3 and N3. The switching element Q9 is electrically connected in series to the switching element Q10 between the terminals P3 and N3. In other words, between the terminals P3 and N3, a series circuit including the switching elements Q5 and Q6, a series circuit including the switching elements Q7 and Q8, and a series circuit including the switching elements Q9 and Q10 are electrically connected in parallel. Each of the switching elements Q5 to Q10 includes a parasitic diode. The respective parasitic diodes of the individual switching elements Q5 to Q10 have anodes electrically connected to sources of the corresponding switching elements Q5 to Q10, while having cathodes electrically connected to drains of the corresponding switching elements Q5 to Q10.

The respective drains of the high potential-side switches Q5, Q7, and Q9 are electrically connected to the terminal P3. The respective sources of the low potential-side switches Q6, Q8, and Q10 are electrically connected to the terminal N3. The source of the high potential-side switch Q5 is electrically connected to the drain of the low potential-side switch Q6. The source of the high potential-side switch Q7 is electrically connected to the drain of the low potential-side switch Q8. The source of the high potential-side switch Q9 is electrically connected to the drain of the low potential-side switch Q10.

The filter circuit 5 smoothens an AC voltage in the form of a rectangular shape output from the converter circuit 4. As a result, the AC voltage in the form of the rectangular wave output from the converter circuit 4 is converted to an AC voltage in the form of a sine wave having an amplitude based on a pulse width.

Specifically, the filter circuit 5 has a plurality of (three in FIG. 1) inductors L11, L12, and L13 and a plurality of (three in FIG. 1) capacitors C11, C12, and C13. One terminal of the inductor L11 is electrically connected to a connection point between the switching elements Q5 and Q6, while another terminal of the inductor L11 is electrically connected to the AC terminal T21. One terminal of the inductor L12 is electrically connected to a connection point between the switching elements Q7 and Q8, while another terminal of the inductor L12 is electrically connected to the AC terminal T22. One terminal of the inductor L13 is electrically connected to a connection point between the switching elements Q9 and Q10, while another terminal of the inductor L13 is electrically connected to the AC terminal T23. The capacitor C11 is electrically connected between the other terminal of the inductor L11 and the other terminal of the inductor L12. The capacitor C12 is electrically connected between the other terminal of the inductor L12 and the other terminal of the inductor L13. The capacitor C13 is electrically connected between the other terminal of the inductor L11 and the other terminal of the inductor L13.

In other words, the connection point between the high potential-side switch Q5 and the low potential-side switch Q6 in the U-phase circuit 41 is electrically connected to the AC terminal T21 corresponding to the U-phase via the inductor L11. The connection point between the high potential-side switch Q7 and the low potential-side switch Q8 in the V-phase circuit 42 is electrically connected to the AC terminal T22 corresponding to the V-phase via the inductor L12. The connection point between the high potential-side switch Q9 and the low potential-side switch Q10 in the W-phase circuit 43 is electrically connected to the AC terminal T23 corresponding to the W-phase via the inductor L13.

The control circuit 6 is formed of a microcomputer including a processor and a memory. In other words, the control circuit 6 is implemented by a computer system including the processor and the memory. Execution of an appropriate program by the processor allows the computer system to function as the control circuit 6. The program may be recorded in advance in the memory or may also be provided by being recorded in a non-transitory recording medium, for example, a memory card, through an electric communication line, for example, the Internet.

The control circuit 6 is configured to control the transformer circuit portion 2 and the converter circuit 4. The control circuit 6 outputs, to the transformer circuit portion 2, drive signals Sig1 to Sig4 for driving the switching elements Q1 and Q2 of the first converter portion 21 and the switching elements Q3 and Q4 of the second converter portion 22, respectively. The control circuit 6 outputs, to the converter circuit 4, drive signals Sig5 to Sig10 for driving the switching elements Q5 to Q10, respectively. Each of the drive signals Sig1 to Sig10 is the PWM signal made of a binary signal, which switches between a HIGH level (an example of the active value) and a LOW level (an example of the non-active value).

(3) Operation

The power conversion system 1 according to the first embodiment performs bidirectional power conversion (transfer) between the DC terminals T11 and T12 and the AC terminals T21, T22, and T23 via the transformer 23. Specifically, the power conversion system 1 has two operation modes, which are an inverter mode and a converter mode. The inverter mode is the mode in which DC power input to each of the DC terminals T11 and T12 is converted to three-phase AC power, and the AC power is output from each of the AC terminals T21, T22, and T23. The converter mode is the mode in which three-phase AC power input to the AC terminals T21, T22, and T23 is converted to DC power, and the DC power is output from the DC terminals T11 and T12.

In other words, the inverter mode is the mode in which, between the AC terminals T21, T22, and T23, a voltage drop occurs in the same direction as a direction in which a current flows via the power system 9, that is, the mode in which the voltage and the current which have the same polarity are generated. The converter mode is the mode in which, between the AC terminals T21, T22, and T23, a voltage drop occurs in a direction opposite to a direction in which a current flows via the power system 9, that is, the mode in which the voltage and the current which have different polarities are generated.

By way of example, a description is given below of a case in which a voltage between the DC terminals T11 and T12 is a voltage Vbat, the operation mode of the power conversion system 1 is the inverter mode, and the power conversion system 1 converts DC power to three-phase AC power at a frequency of 50 Hz or 60 Hz. Further, in the case described below by way of example, a drive frequency for each of the switching elements Q1 to Q4 is 20 kHz.

The control circuit 6 controls the first converter portion 21 such that a positive voltage and a negative voltage are alternately applied to the primary winding 231. Meanwhile, the control circuit 6 controls the second converter portion 22 such that a voltage of the terminal P3 (first connection terminal) is positive with respect to that of the terminal N3 (second connection terminal).

Specifically, the control circuit 6 controls the switching elements Q1 to Q4 such that the switching elements Q1 and Q3 are OFF when the switching elements Q2 and Q4 are ON, while, the switching elements Q1 and Q3 are ON when the switching elements Q2 and Q4 are OFF. The control circuit 6 controls the switching elements Q1 to Q4 at the same duty ratio. In the first embodiment, the duty ratio for each of the switching elements Q1 to Q4 is "0.5" (substantially 50%).

The control circuit 6 controls the first converter portion 21 such that a high-frequency AC voltage is supplied to each of the primary winding 231 and the secondary winding 232 and controls the second converter portion 22 such that a voltage having the positive polarity is supplied between the terminals P3 and N3.

The control circuit 6 turns ON or OFF each of the switching elements Q5 to Q10, to thereby control an amplitude of at least one of a voltage and a current which are output from the AC terminals T21, T22, and T23.

The control circuit 6 controls the converter circuit 4 such that, during each of first periods T1 (see FIG. 8) including the inversion period Td1 during which a polarity of the voltage applied to the primary winding 231 is inverted, power is not transferred between the transformer circuit portion 2 and the converter circuit 4. The control circuit 6 also controls the converter circuit 4 such that, during each of second periods T2 (see FIG. 8) different from the first periods T1, power is transferred in a first direction extending from the transformer circuit portion 2 toward the converter circuit 4 or in a second direction opposite to the first direction.

Specifically, the control circuit 6 operates so as to repeat first to fourth modes described below.

In the first mode, the control circuit 6 outputs the drive signals Sig1 to Sig4 to the first converter portion 21 and to the second converter portion 22 such that the switching elements Q2 and Q4 are ON and the switching element Q1 and Q3 are OFF. In this period, a voltage across two terminals of the winding L1 of the primary winding 231 is "+Vbat", while a voltage across two terminals of the winding L2 of the primary winding 231 is "+Vbat". Consequently, a voltage across two terminals of the winding L3 of the secondary winding 232 is "+Vbat", while a voltage across two terminals of the winding L4 of the secondary winding 232 is "+Vbat". In this period, the switching element Q4 is ON, and consequently, a voltage of the terminal P3 based on the terminal N3 is "+Vbat".

In the second mode, the control circuit 6 outputs the drive signals Sig5 to Sig10 to the converter circuit 4 such that the low potential-side switches Q6, Q8, and Q10 are OFF and the high potential-side switches Q5, Q7, and Q9 are ON. This results in a circulation mode in which a current circulates in the converter circuit 4. In this period, all the switching elements Q1 to Q4 in the transformer circuit portion 2 are OFF.

In the third mode, the control circuit 6 outputs the drive signals Sig1 to Sig4 to the first converter portion 21 and to the second converter portion 22 such that the switching elements Q1 and Q3 are ON and the switching element Q2 and Q4 are OFF. In this period, a voltage across two terminals of the winding L1 of the primary winding 231 is "−Vbat", while a voltage across two terminals of the winding L2 of the primary winding 231 is "−Vbat". Consequently, a voltage across two terminals of the winding L3 of the secondary winding 232 is "−Vbat", while a voltage across two terminals of the winding L4 of the secondary winding 232 is "−Vbat". In this period, the switching element Q3 is ON, and consequently, a voltage of the terminal P3 based on the terminal N3 is "+Vbat".

In the fourth mode, the control circuit 6 outputs the drive signals Sig5 to Sig10 to the converter circuit 4 such that the high potential-side switches Q5, Q7, and Q9 are OFF and the low potential-side switches Q6, Q8, and Q10 are ON. This results in a circulation mode in which a current circulates in the converter circuit 4. In this period, all the switching elements Q1 to Q4 in the transformer circuit portion 2 are OFF.

The control circuit 6 repeats respective operations described above in the first mode, the second mode, the third mode, and the fourth mode in the stated order. As a result, the voltage of the terminal P3 with respect to that of the terminal N3 is maintained at "+Vbat" and supplied to the converter circuit 4. As a result, a substantially constant voltage Vbat is supplied to the converter circuit 4.

In the power conversion system 1 according to the first embodiment, the control circuit 6 controls, for each of the U-phase circuit 41, the V-phase circuit 42, and the W-phase circuit 43, the high potential-side switches Q5, Q7, and Q9 through use of the drive signals Sig5, Sig7, and Sig9 (examples of the PWM signals). The control circuit 6 alternately switches between the first modulation method and the second modulation method at each half carrier period of the PWM signals (drive signals Sig5, Sig7, and Sig9). In the first modulation method, the control circuit 6 determines, as the first value, the duty ratio of the PWM signal (drive signal Sig5, Sig7, or Sig9) for one of the U phase, the V phase, and the W phase that has the maximum phase voltage. In the second modulation method, the control circuit 6 determines, as the second value, the duty ratio of the PWM signal (drive signal Sig5, Sig7, or Sig9) for one of the U phase, the V phase, and the W phase that has the minimum phase voltage. In the first embodiment, the control circuit 6 applies the first modulation method to a first half carrier period of the carrier period, while applying the second modulation method to a second half carrier period of the carrier period.

Figure 2:
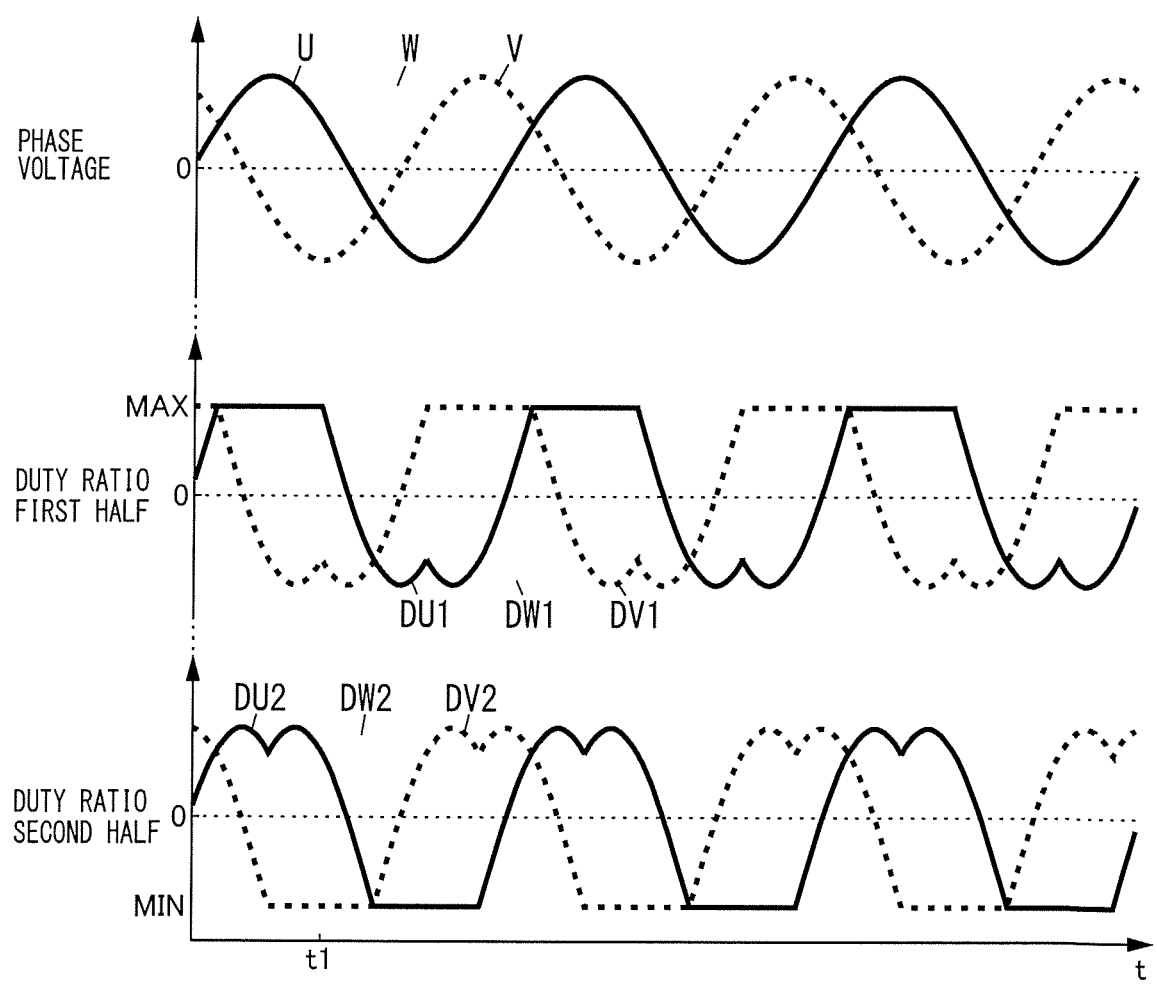
FIG. 2 is an explanatory graph of inter-AC-line modulation to be adopted in the above-mentioned power conversion system.

As a result, as shown in FIG. 2, the inter-AC-line modulation in which the duty ratio is set at each half carrier period of the PWM signals is achieved. In FIG. 2, the respective phase voltages for the U phase, the V phase, and the W phase, the duty ratios of the PWM signals during a first half of the carrier period, and the duty ratios of the PWM signals during a second half of the carrier period are shown in top-to-bottom order. In FIG. 2, for the phase voltages, the U phase, the V phase, and the W phase are denoted by "U", "V", and "W", respectively. Likewise, for the duty ratio during the first half of the carrier period, the U phase, the V phase, and the W phase are denoted by "DU1", "DV1", and "DW1", respectively, while, for the duty ratio during the second half of the carrier period, the U phase, the V phase, and the W phase are denoted by "DU2", "DV2", and "DW2", respectively.

For example, in the first modulation method, when the phase voltage for the U-phase is higher than each of the phase voltages for the V phase and the W phase, the duty ratio of the drive signal Sig5 for controlling the high potential-side switch Q5 of the U-phase circuit 41 corresponding to the U phase is determined as the first value. Accordingly, during a period during which the phase voltage for the U phase is higher than each of the phase voltages for the V phase and the W phase, the duty ratio (DU1) of the U-phase PWM signal (drive signal Sig5) during the first half of the carrier period is set to the first value ("MAX" in FIG. 2). Meanwhile, in the second modulation method, when the phase voltage for the W phase is lower than each of the phase voltages for the U phase and the V phase, the duty ratio of the drive signal Sig9 for controlling the high potential-side switch Q9 of the W-phase circuit 43 corresponding to the W phase is determined as the second value. Accordingly, during a period during which the phase voltage for the W phase is lower than each of the phase voltages for the U phase and the V phase, the duty ratio (DW2) of the W-phase PWM signal (drive signal Sig9) during the second half of the carrier period is set to the second value ("MIN" in FIG. 2).

The first value is a value larger than each of the duty ratios of the PWM signals for two of the U phase, the V phase, and the W phase that do not have the maximum phase voltage in the first modulation method. Specifically, the first value corresponds to a maximum value ("MAX" in FIG. 2) of the duty ratio. The "maximum value of the duty ratio" mentioned in this disclosure indicates a maximum value in a variable range of the duty ratio. In other words, when the duty ratio varies in a range of from "0" to "1", "1" corresponds to the maximum value of the duty ratio.

The second value is a value smaller than each of the duty ratios of the PWM signals for two of the U phase, the V phase, and the W phase that do not have the minimum phase voltage in the second modulation method. Specifically, the second value corresponds to a minimum value ("MIN" in FIG. 2) of the duty ratio. The "minimum value of the duty ratio" mentioned in this disclosure indicates a minimum value in a variable range of the duty ratio. In other words, when the duty ratio varies in a range of from "0" to "1", "0" corresponds to the minimum value of the duty ratio.

In the first modulation method, the control circuit 6 determines the duty ratios of the PWM signals for two of the U phase, the V phase, and the W phase that do not have the maximum phase voltage based on the phase voltages. Meanwhile, in the second modulation method, the control circuit 6 determines the duty ratios of the PWM signals for two of the U phase, the V phase, and the W phase that do not have the minimum phase voltage based on the phase voltages.

For example, in the first modulation method, when the phase voltage for the U phase is higher than each of the phase voltages for the V phase and the W phase, the duty ratios of the drive signals Sig7 and Sig9 corresponding to the V phase and the W phase are determined based on the phase voltages. Accordingly, during the period during which the phase voltage for the U phase is higher than each of the phase voltages for the V phase and the W phase, the duty ratios (DV1 and DW1) of the V- and W-phase PWM signals during the first half of the carrier period have variable values that vary based on the phase voltages. Meanwhile, in the second modulation method, when the phase voltage for the W phase is lower than the phase voltages for the U phase and the V phase, the duty ratios of the drive signals Sig5 and Sig7 corresponding to the U phase and the V phase are determined based on the phase voltages. Accordingly, during the period during which the phase voltage for the W phase is lower than the phase voltages for the U phase and the V phase, the duty ratios (DU2 and DV2) of the U- and V-phase PWM signals during the second half of the carrier period have variable values that vary based on the phase voltages.

Note that, in the first modulation method, the duty ratios of the PWM signals for two of the U phase, the V phase and the W phase that do not have the maximum phase voltage are not required to be determined based on the phase voltages while, in the second modulation method, the duty ratios of the PWM signals for two of the U phase, the V phase, and the W phase that do not have the minimum phase voltage are not required to be determined based on the phase voltages. The duty ratios may also be determined based on, for example, respective phases of the individual phase voltages.

Figure 3:
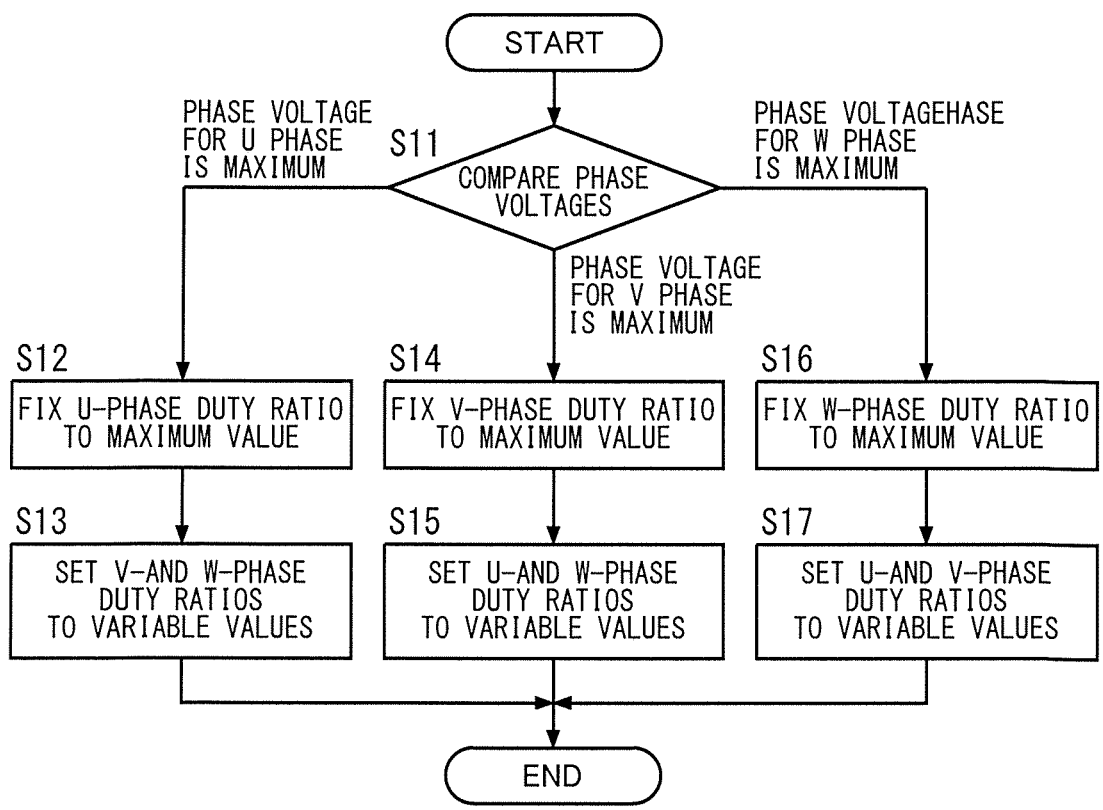
FIG. 3 is a flow chart for illustrating an example of a procedure for determining duty ratios in a first modulation method in the above-mentioned power conversion system.

FIG. 3 is a flow chart for illustrating an example of the first modulation method in the control circuit 6, that is, a procedure of determining the duty ratios of the U-, V-, and W-phase PWM signals during the first half of the carrier period. Specifically, the control circuit 6 compares the phase voltages to each other (Step S11). At this time, when the phase voltage for the U phase is maximum, the control circuit 6 fixes the duty ratio of the U-phase drive signal Sig5 to a maximum value (Step S12), while setting the duty ratios of the V- and W-phase drive signals Sig7 and Sig9 to variable values based on the phase voltages (Step S13). When the phase voltage for the V phase is maximum, the control circuit 6 fixes the duty ratio of the V-phase drive signal Sig7 to the maximum value (Step S14), while setting the duty ratios of the U- and W-phase drive signals Sig5 and Sig9 to variable values based on the phase voltages (Step S15). When the phase voltage for the W phase is maximum, the control circuit 6 fixes the duty ratio of the W-phase drive signal Sig9 to the maximum value (Step S16), while setting the duty ratios of the U- and V-phase drive signals Sig5 and Sig7 to variable values based on the phase voltages (Step S17).

Figure 4:
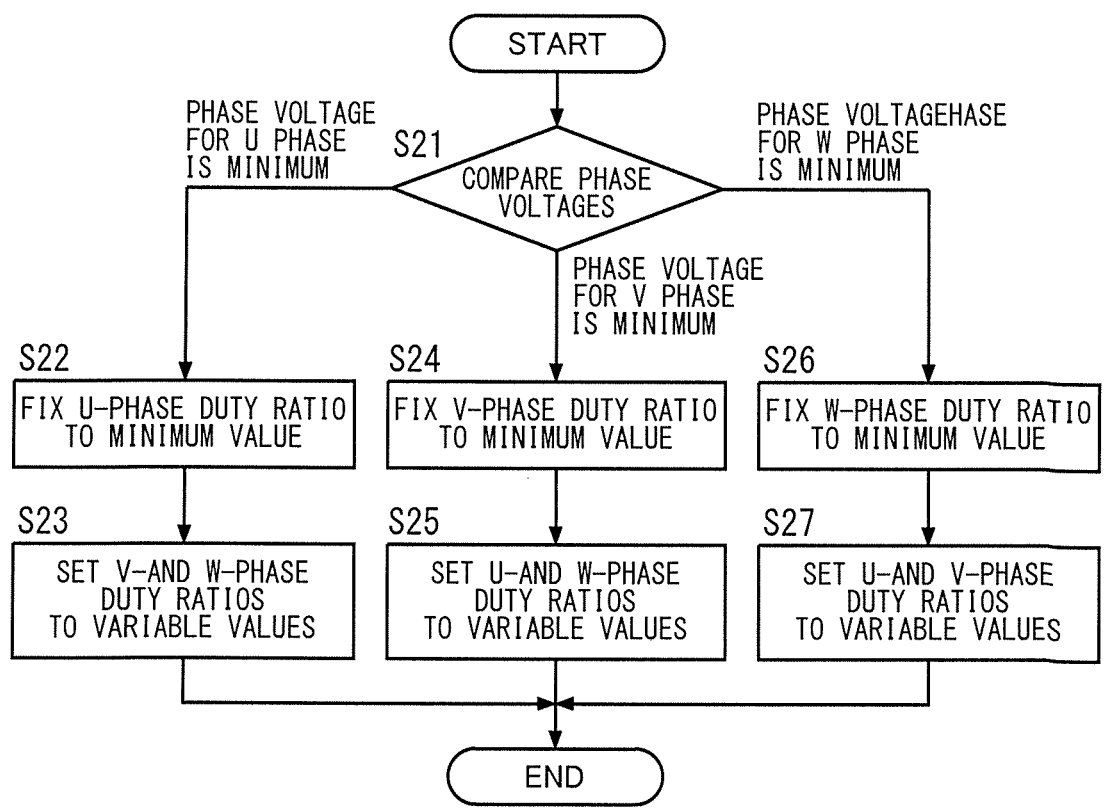
FIG. 4 is a flow chart for illustrating an example of a procedure for determining the duty ratios in a second modulation method in the above-mentioned power conversion system.

FIG. 4 is a flow chart for illustrating an example of the second modulation method in the control circuit 6, that is, a procedure of determining the duty ratios of the U-, V-, and W-phase PWM signals during the second half of the carrier period. Specifically, the control circuit 6 compares the phase voltages to each other (Step S21). At this time, when the phase voltage for the U phase is minimum, the control circuit 6 fixes the duty ratio of the U-phase drive signal Sig5 to a minimum value (Step S22), while setting the duty ratios of the V- and W-phase drive signals Sig7 and Sig9 to variable values based on the phase voltages (Step S23). When the phase voltage for the V phase is minimum, the control circuit 6 fixes the duty ratio of the V-phase drive signal Sig7 to the minimum value (Step S24), while setting the duty ratios of the U- and W-phase drive signals Sig5 and Sig9 to variable values based on the phase voltages (Step S25). When the phase voltage for the W phase is minimum, the control circuit 6 fixes the duty ratio of the W-phase drive signal Sig9 to the minimum value (Step S26), while setting the duty ratios of the U- and V-phase drive signals Sig5 and Sig7 to variable values based on the phase voltages (Step S27).

Figure 5:
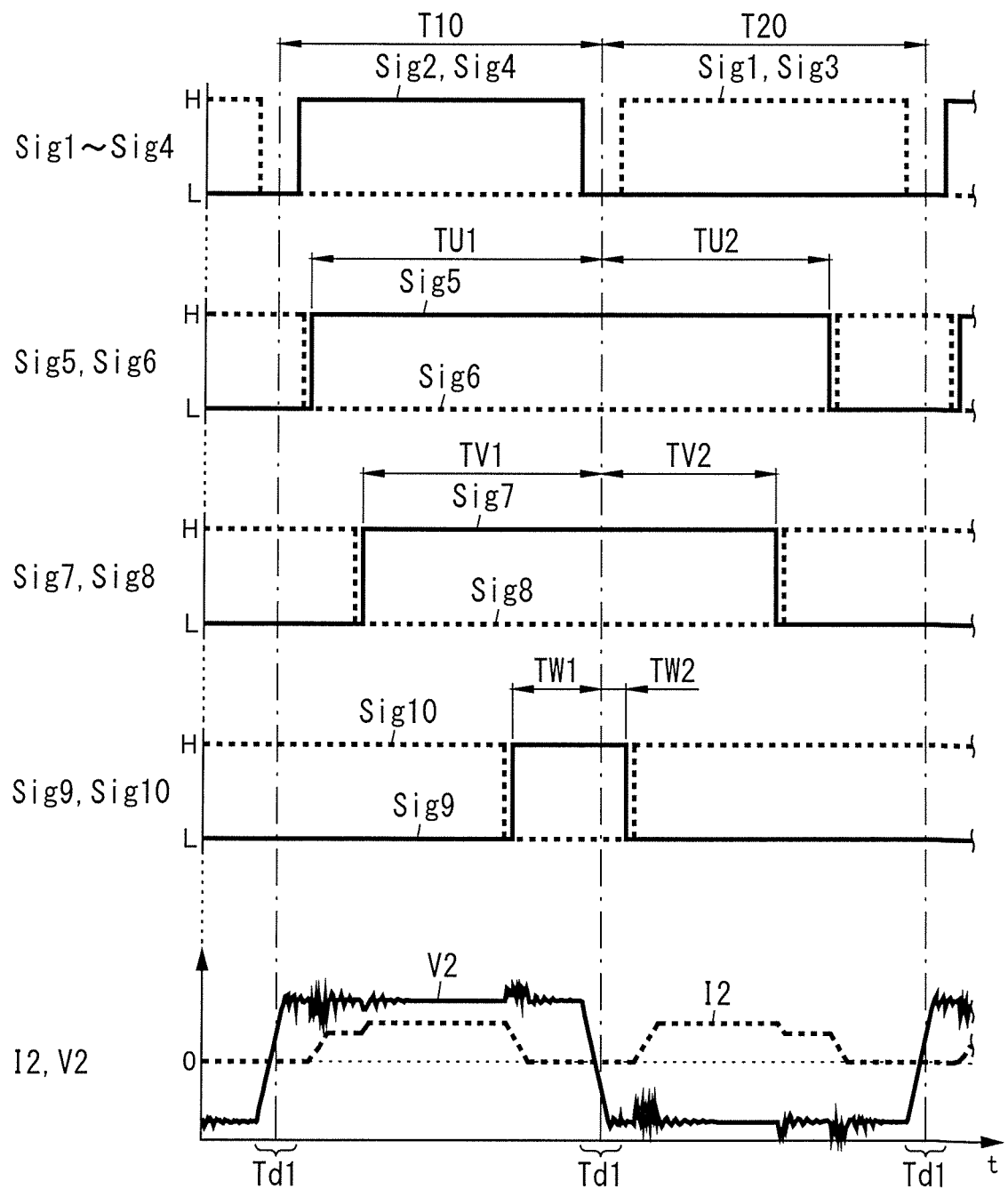
FIG. 5 is a waveform chart for showing an operation of the above-mentioned power conversion system in an inverter mode.

FIG. 5 is a waveform chart for showing an operation of the power conversion system 1 according to the first embodiment in the inverter mode. In FIG. 5, an abscissa axis corresponds to a time axis.

In FIG. 5, the drive signals Sig1 to Sig4, the drive signals Sig5 and Sig6, the drive signals Sig7 and Sig8, the drive signals Sig9 and Sig10, a voltage V2, and a current I2 are shown in top-to-bottom order. For the drive signals Sig1 to Sig10, a HIGH level is denoted by "H" in FIG. 5, while a LOW level is denoted by "L" in FIG. 5. Each of the switching elements Q1 to Q10 is ON when the corresponding one of the drive signals Sig1 to Sig10 is at the HIGH level. Each of the switching elements Q1 to Q10 is OFF when the corresponding one of the drive signals Sig1 to Sig10 is at the LOW level. The voltage V2 is a voltage generated across two terminals of the secondary winding 232. The current I2 is a current flowing from the secondary center tap CT2 to the terminal P3.

As shown in FIG. 5, a period during which the switching elements Q1 to Q4 of the transformer circuit portion 2 are OFF corresponds to the inversion period Td1 during which the polarity of the voltage applied to the primary winding 231 is inverted. Further, as shown in FIG. 5, the carrier period during which a positive voltage and a negative voltage repeatedly alternate in the primary winding 231 is divided into a first half T10 and a second half T20. The duty ratio of the U-phase PWM signal (drive signal Sig5) during the first half T10 of the carrier period corresponds to a ratio of a period ("TU1" in FIG. 5) during which the drive signal Sig5 is at the HIGH level to the first half T10. Likewise, the duty ratios of the V- and W-phase PWM signals during the first half T10 of the carrier period correspond to ratios of respective periods ("TV1" and "TW1" FIG. 5) during which the drive signals Sig7 and Sig9 are at the HIGH level to the first half T10. Meanwhile, the duty ratio of the U-phase PWM signal (drive signal Sig5) during the second half T20 of the carrier period corresponds to a ratio of a period ("TU2" in the drawing) during which the drive signal Sig5 is at the HIGH level to the second half T20. Likewise, the duty ratios of the V- and W-phase PWM signals during the second half T20 of the carrier period correspond to ratios of respective periods ("TV2" and "TW2" in FIG. 5) during which the drive signals Sig7 and Sig9 are at the HIGH level to the second half T20.

In the example illustrated in FIG. 5, during the first half T10 of the carrier period, the duty ratio of the drive signal Sig5 corresponding to the high potential-side switch Q5 for the U-phase, which has the maximum phase voltage, is fixed to a maximum value. At this time, the duty ratios of the drive signals Sig7 and Sig9 corresponding to the high potential-side switches Q7 and Q9 for the V- and W-phases are appropriately set based on the phase voltages. During the second half T20 of the carrier period, the duty ratio of the drive signal Sig9 corresponding to the high potential-side switch Q9 for the W-phase, which has the minimum phase voltage, is fixed to a minimum value. At this time, the duty ratios of the drive signals Sig5 and Sig7 corresponding to the high potential-side switches Q5 and Q7 for the U- and V-phases are appropriately set based on the phase voltages.

As is obvious from FIG. 5, the polarity of the voltage applied to the primary winding 231 is inverted at each half carrier period of the PWM signal. The first modulation method and the second modulation method are switched during the inversion period Td1. In other words, in the first embodiment, in the control circuit 6, at each half carrier period of the PWM signals, a state in which the switching elements Q2 and Q4 are ON and a state in which the switching elements Q1 and Q3 are ON repeatedly alternate. A time at which the first modulation method and the second modulation method are switched, that is, a boundary point between the first half T10 and the second half T20 of the carrier period is set in synchronization with the inversion period Td1 so as to be included in the inversion period Td1. Particularly in the first embodiment, a time at which the first modulation method and the second modulation method are switched is located at substantially a center of the inversion period Td1. The operation of the power conversion system 1 shown in FIG. 5 is only exemplary. It may also be possible that, for example, the switching elements Q1 and Q3 are ON during the first half T10 of the carrier period, while the switching elements Q2 and Q4 are ON during the second half T20 of the carrier period.

(4) Comparison with Comparative Example

Figure 6C:
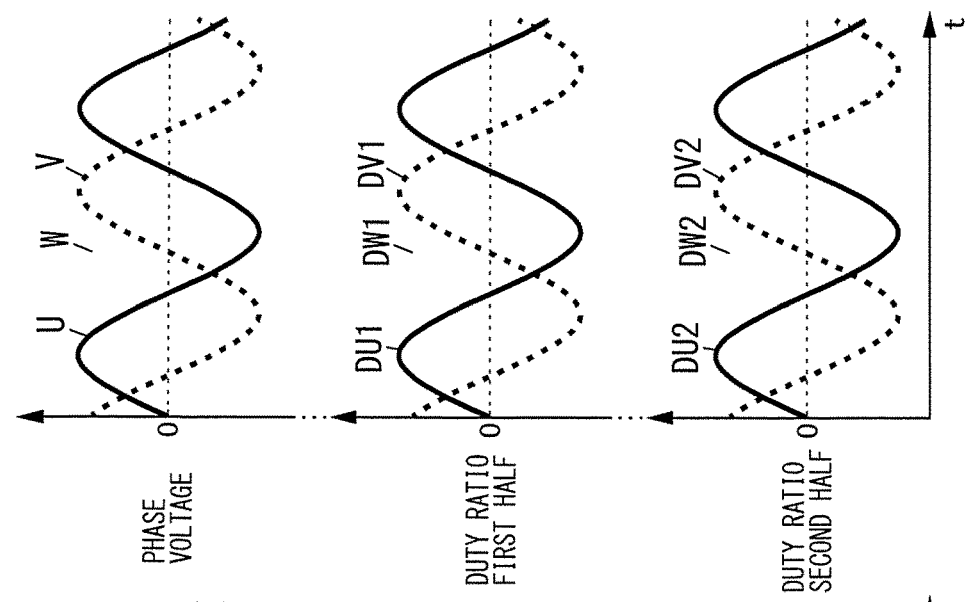
FIG. 6C is an explanatory graph of three-phase modulation.
Figure 6B:
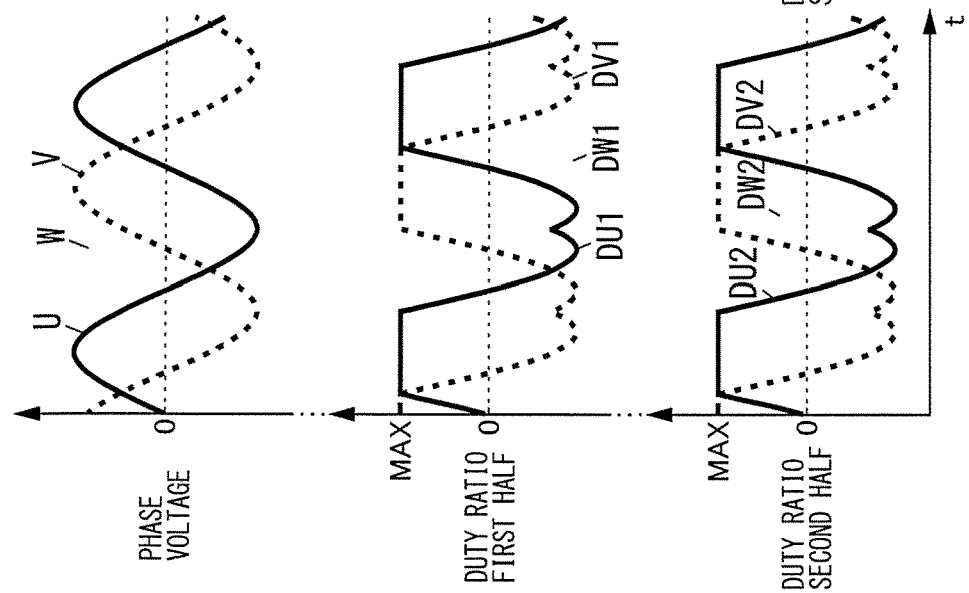
FIG. 6B is an explanatory graph of inter-line modulation.
Figure 6A:
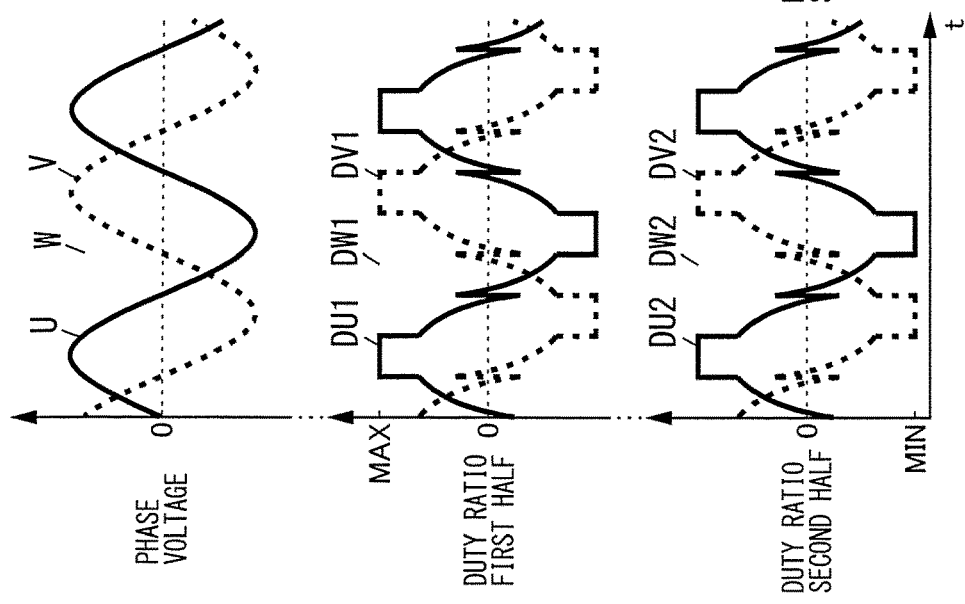
FIG. 6A is an explanatory graph of three-phase modulation.

FIG. 6A, FIG. 6B, and FIG. 6C are explanatory diagrams of a modulation method as a comparative example for the power conversion system 1 according to the first embodiment. In FIG. 6A, FIG. 6B, and FIG. 6C, in the same manner as that in FIG. 2, respective phase voltages for the U phase, the V phase, and the W phase, the duty ratios of the PWM signals during the first half of the carrier period, and the duty ratios of the PWM signals during the second half of the carrier period are shown in top-to-bottom order. Further, in FIG. 6A, FIG. 6B, and FIG. 6C, reference symbols (such as U, V, and W) similar to those used in FIG. 2 are used.

FIG. 6A is an explanatory graph of two-phase modulation. FIG. 6B is an explanatory graph of inter-line modulation. FIG. 6C is an explanatory graph of three-phase modulation. As shown in FIG. 6A, in the two-phase modulation, during any one of the first half T10 and the second half T20 of the carrier period, the duty ratio of the PWM signal only for any one of the U phase, the V phase, and the W phase is fixed to the maximum value MAX or the minimum value MIN. As shown in FIG. 6B, in the inter-line modulation, during any one of the first half T10 and the second half T20 of the carrier period, the duty ratio of the PWM signal only for any one of the U phase, the V phase, and the W phase is fixed to the maximum value MAX. As shown in FIG. 6C, in the three-phase modulation, during any one of the first half T10 and the second half T20 of the carrier period, the duty ratios of the PWM signals for the U phase, the V phase, and the W phase have variable values.

When a comparison is made between such a modulation method as the comparative example and the modulation method (inter-AC-line modulation) adopted in the power conversion system 1 according to the first embodiment, the inter-AC-line modulation has the following advantages.

Specifically, in the inter-AC-line modulation, continuity of a duty ratio is relatively high and a frequency with which the duty ratio is varied is relatively low as compared to those in the modulation method as the comparative example. For example, attention is focused on a time point (time point t1 in FIG. 2) at which a state in which the U-phase duty ratio (DU1) is fixed to the first value switches to a state in which the W-phase duty ratio (DW1) is fixed to the first value during the first half T10 of the carrier period. At the time point t1 during the first half T10 of the carrier period, each of the U-, V-, and W-phase duty ratios (DU1, DV1, and DW1) continuously varies. At the time point t1 during the second half T20 of the carrier period, each of the U- and W-phase duty ratios (DU2 and DW2) continuously varies, while the V-phase duty ratio (DV2) does not vary. Accordingly, in the power conversion system 1 according to the first embodiment, both of distortion of an output waveform from the converter circuit 4 resulting from switching of the duty ratio and total harmonic distortion (THD) can be reduced. In addition, the modulation methods during the first half T10 and the second half T20 of the carrier period are switched, and hence a carrier frequency component of an output voltage is attenuated, and the distortion of the output waveform can be suppressed.

Consequently, the power conversion system 1 according to the first embodiment is advantageous in that, when power conversion is performed between a direct current and a three-phase alternating current, it is possible to reduce the waveform distortion of the output waveform.

Figure 7:
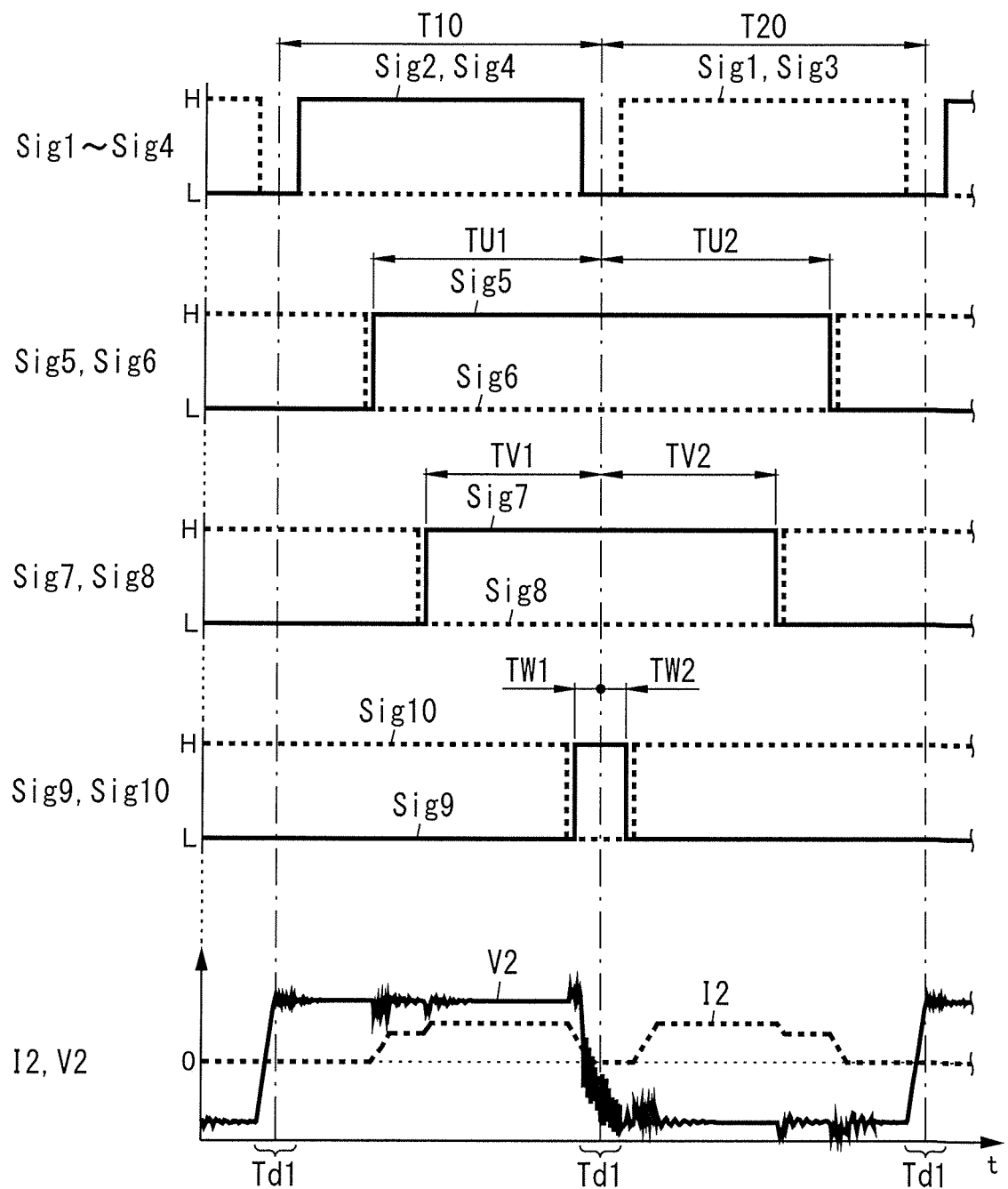
FIG. 7 is a waveform chart for showing a case in which two-phase modulation is adopted.

FIG. 7 is a waveform chart for showing a case in which the two-phase modulation is adopted. In FIG. 7, in the same manner as that in FIG. 5, an abscissa axis corresponds to a time axis, and the drive signals Sig1 to Sig4, the drive signals Sig5 and Sig6, the drive signals Sig7 and Sig8, the drive signals Sig9 and Sig10, the voltage V2, and the current I2 are shown in top-to-bottom order. Further, in FIG. 7, reference symbols (such as I2 and V2) similar to those used in FIG. 5 are used.

Compared to that in FIG. 7, in the power conversion system 1 according to the first embodiment, during the first half T10 of the carrier period, as shown in FIG. 5, a time at which the W-phase low potential-side switch Q10 is turned OFF is advanced due to an effect of the inter-line modulation. In other words, each of the falling edges (changing point from the HIGH level to the LOW level) of the drive signals Sig6, Sig8, and Sig10 during the first half T10 of the carrier period is advanced (shifted leftward in FIG. 5). As a result, when a load current increases, even though a residual current resulting from leakage inductance of the transformer 23 is generated for a relatively long period of time, the residual current is less likely to last till the inversion period Td1. Consequently, sudden inversion of a voltage of the transformer 23 can be suppressed. In addition, in the transformer 23, imbalance between positive and negative excitation currents can be suppressed, and so-called uneven polarization is less likely to occur.

Accordingly, in the power conversion system 1 according to the first embodiment, it is possible to cause relatively stable inversion of the polarity of the voltage applied to the primary winding 231, to thereby reduce a loss in each of the switching elements Q1 to Q10 as well as a breakdown voltage thereof.

(5) First Period and Second Period

Figure 8:
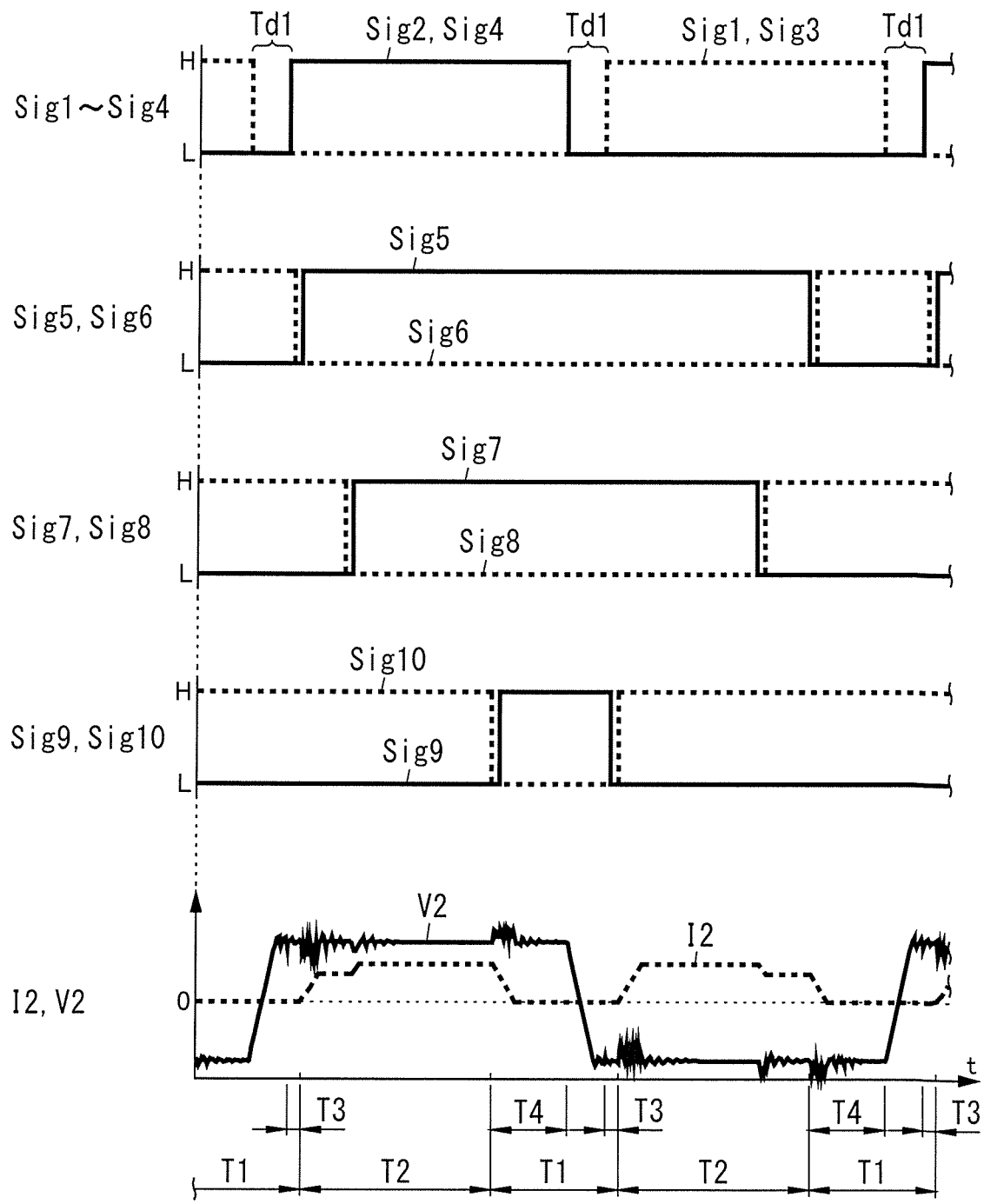
FIG. 8 is an explanatory graph for clearly showing a first period and a second period in the same waveform chart as that of FIG. 5.

FIG. 8 is a graph for clearly showing the first periods T1 and the second periods T2 in the same waveform chart as that of FIG. 5. In FIG. 8, in the same manner as that in FIG. 5, an abscissa axis corresponds to a time axis, and the drive signals Sig1 to Sig4, the drive signals Sig5 and Sig6, the drive signals Sig7 and Sig8, the drive signals Sig9 and Sig10, the voltage V2, and the current I2 are shown in top-to-bottom order. Further, in FIG. 8, reference symbols (such as I2 and V2) similar to those used in FIG. 5 are used.

As described above, the control circuit 6 controls the converter circuit 4 such that, during each of the first periods T1 including the inversion period Td1 during which the polarity of the voltage applied to the primary winding 231 is inverted, power is not transferred between the transformer circuit portion 2 and the converter circuit 4. The control circuit 6 also controls the converter circuit 4 such that, during each of the second periods T2 different from the first periods T1, power is transferred in the first direction extending from the transformer circuit portion 2 toward the converter circuit 4 or in the second direction opposite to the first direction.

More specifically, in the power conversion system 1, into a unit period corresponding to the half carrier period of the PWM signals, the first period T1 and the second period T2 are allocated. In addition, to the first period T1, the inversion period Td1 and a circulation period are allocated while, to the second period T2, a supply period is allocated. When the operation mode of the power conversion system 1 is the inverter mode, to the second period T2, the supply period is allocated as described above. However, when the operation mode of the power conversion system 1 is the converter mode, to the second period T2, a regeneration period is allocated.

The control circuit 6 performs PWM control over the converter circuit 4 to change a ratio of the second period T2 to each of the unit periods (half carrier period), to thereby generate an intended voltage or current. For example, the intended voltage or current is a voltage or current having the same waveform as that of a modulation wave signal used for the PWM control.

A first period length corresponding to a length of a period T4 from a start point of the first period T1 to a start point of the inversion period Td1 is equal to or longer than a second period length corresponding to a length of a period T3 from an end point of the inversion period Td1 to an end point of the first period T1. In other words, when a comparison is made between the respective period lengths of the period T4 and the period T3, which are set before and after the inversion period Td1 in the first period T1, the period length of the period T4 before the inversion period Td1 is equal to or longer than the period length of the period T3 after the inversion period Td1. In an example illustrated in FIG. 8, the period length (first period length) of the period T4 is longer than the period length (second period length) of the period T3.

Particularly in the first embodiment, even when the DC voltage applied at least to the DC terminals T11 and T12 has a maximum value within a rated operation range, the first period length (period length of the period T4) is equal to or longer than the second period length (period length of the period T3).

In other words, the voltage applied to the power system 9 has a value determined by a specification, but a voltage of the storage battery 8 has a given range allowed by the specification. For example, when the voltage of the storage battery 8 increases, the excitation currents in the transformer 23 increase, as a result a voltage utilization factor decreases. In other words, an excess period is increased. As a result, even when an eddy current which is not supposed be generated during a steady state period is generated, by setting the first period length (period length of the period T4) longer than the second period length (period length of the period T3), it is possible to have a longer period during which a residual current attenuates.

Conversely, when the voltage of the storage battery 8 is relatively low, the voltage utilization factor increases, while the excess period decreases. In this case, even when the first period length (period length of the period T4) is set longer than the second period length (period length of the period T3), it may be impossible to have a sufficient period during which the residual current attenuates. At this time, the voltage of the transformer 23 may be suddenly inverted to cause uneven magnetization. In general, when uneven magnetization occurs, the excitation currents in the transformer 23 increase, and a higher DC superimposition characteristic is required. In the first embodiment as well, when the voltage of the storage battery 8 is low, uneven magnetization may occur but, due to excitation currents which are originally small, uneven magnetization is unlikely to present a problem.

It is preferred herein to reduce the second period length (period length of the period T3) to a minimum required value and increase the first period length (period length of the period T4) to a maximum value within a range available to the first period length.

The periods T3 and T4 can also be defined as follows. Specifically, while the power conversion system 1 is operating in the inverter mode, a period from an end point of the second period T2 as the supply period to a start point of the inversion period Td1 corresponds to the period T4, and a period from an end point of the inversion period Td1 to a start point of the second period T2 as the supply period corresponds to the period T3. Likewise, while the power conversion system 1 is operating in the converter mode, the period from the end point of the second period T2 as the regeneration period to the start point of the inversion period Td1 corresponds to the period T4, and the period from the end point of the inversion period Td1 to the start point of the second period T2 as the regeneration period corresponds to the period T3.

(6) Modification Example

The first embodiment is only one of various embodiments of this disclosure. The first embodiment can variously be modified based on design or the like as long as the object of this disclosure can be attained. The same function as that of the power conversion system 1 may also be embodied by a power supply method, a computer program, a non-transitory recording medium having a program recorded thereon, or the like. Modification examples described below are applicable by being appropriately combined with each other. The modification examples of the first embodiment are listed below.

For example, the power conversion system 1 in this disclosure has a computer system included in the control circuit 6. The computer system includes a processor and a memory as hardware main components. Through execution of a program recorded in the memory of the computer system by the processor, a function of the power conversion system 1 in this disclosure is implemented. The program may be recorded in advance in the memory of the computer system, may be provided through an electric communication line, or may be provided by being recorded on a non-transitory recording medium readable by the computer system, such as a memory card, an optical disc, or a hard disk drive. The processor of the computer system includes one or more electronic circuits each including a semiconductor integrated circuit (IC) or a large-scale integrated circuit (LSI). The plurality of electronic circuits may be integrated into one chip or may also be provided dispersedly in a plurality of chips. The plurality of chips may be integrated into one device or may also be provided dispersedly in a plurality of devices.

Note that a configuration in which the plurality of components of the power conversion system 1 are contained in one casing is not essential to the power conversion system 1. The plurality of components of the power conversion system 1 may also be provided dispersedly in a plurality of casings. A part of the functions of the power conversion system 1, for example, the function of the control circuit 6 may also be implemented by a server system, a cloud (cloud computing), or the like.

In the first embodiment, the operation in the inverter mode has mainly been described, but the same procedure can also be applied to the operation in the converter mode.

Further, in the first embodiment, the power conversion system 1 has the two operation modes, which are the inverter mode and the converter mode. However, this configuration is not essential to the power conversion system 1. In other words, the power conversion system 1 is not limited to the configuration in which bidirectional power conversion (transfer) is performed between the DC terminals T11 and T12 and the AC terminals T21, T22, and T23 as in the first embodiment. The power conversion system 1 may also be configured to perform unidirectional power conversion from the DC terminals T11 and T12 to the AC terminals T21, T22, and T23 or from the AC terminals T21, T22, and T23 to the DC terminals T11 and T12.

To each of the switching elements Q1 to Q10, instead of the parasitic diode, an external diode may also be connected. Each of the switching elements Q1 to Q10 is not limited to the MOSFET, and may also be, for example, an npn-type insulated-gate bipolar transistor. In this case, the diode is electrically connected between an emitter and a collector so as to be oriented in a direction in which a current opposite to a current flowing in the switching element when the switching element is ON is allowed to flow.

The control circuit 6 is not limited to the microcomputer, and may also be implemented by, for example, a central processing unit (CPU), a field-programmable gate array (FPGA), or an application specific integrated circuit (ASIC).

The first value and the second value are not limited to fixed values. For example, the first value and the second value may also be variable values that vary as an input/output voltage (the voltage applied to the DC terminals T11 and T12 or the voltage applied to the AC terminals T21, T22, and T23) varies.

The first period length corresponding to the length of the period T4 from the start point of the first period T1 to the start point of the inversion period Td1 may also be equal to the second period length corresponding to the length of the period T3 from the end point of the inversion period Td1 to the end point of the first period T1.

In the first embodiment, the first modulation method is applied to the half carrier period corresponding to the first half T10 of the carrier period, while the second modulation method is applied to the half carrier period corresponding to the second half T20 of the carrier period. However, this configuration is not essential to the power conversion system 1. For example, the control circuit 6 may also apply the second modulation method to the half carrier period corresponding to the first half T10 of the carrier period and apply the first modulation method to the half carrier period corresponding to the second half T20 of the carrier period.

Second Embodiment

Figure 9:
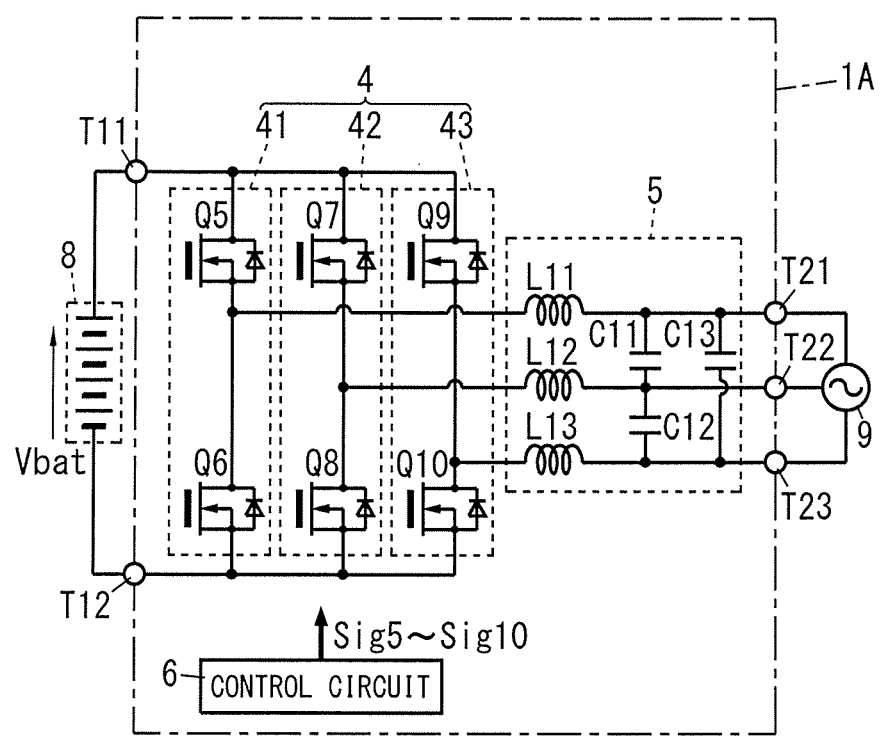
FIG. 9 is a circuit diagram for illustrating a schematic configuration of a power conversion system according to a second embodiment of this disclosure.

As illustrated in FIG. 9, a power conversion system 1A according to a second embodiment of this disclosure is different from the power conversion system 1 according to the first embodiment in that the power conversion system 1A is a non-insulated power conversion system, which does not include the transformer circuit portion 2. A description of the same configuration as that in the first embodiment is appropriately omitted below by using common reference symbols.

The power conversion system 1A has a configuration obtained by omitting, from the power conversion system 1 (see FIG. 1) according to the first embodiment, the first capacitor C10, the transformer circuit portion 2, and the connection portion 3. Accordingly, the control circuit 6 outputs only the drive signals Sig5 to Sig10 for controlling the converter circuit 4. In the second embodiment, the converter circuit 4 is connected directly to the two DC terminals T11 and T12.

In the power conversion system 1A of the second embodiment as well, in the same manner as in the first embodiment, the inter-AC-line modulation is adopted. Accordingly, in the power conversion system 1A according to the second embodiment, both of the distortion of the output waveform from the converter circuit 4 resulting from switching of the duty ratio and the total harmonic distortion can be reduced. In addition, the modulation methods during the first half T10 and the second half T20 of the carrier period are switched, and hence a carrier frequency component is attenuated in the output voltage, and the distortion of the output waveform can be suppressed. Consequently, similarly to the first embodiment, the second embodiment is advantageous in that, when power conversion is performed between a direct current and a three-phase current, it is possible to reduce the waveform distortion of the output waveform.

The configuration described in the second embodiment is applicable by being appropriately combined with the configuration described in the first embodiment (including the modification examples).

SUMMARY

As described above, the power conversion system (1, 1A) according to a first aspect of this disclosure is the power conversion system configured to perform power conversion between the DC terminals (T11, T12) and the AC terminals (T21, T22, T23), and includes the converter circuit (4) and the control circuit (6). The DC terminals (T11, T12) are configured to be electrically connected to a DC power source or a DC load. The AC terminals (T21, T22, T23) are configured to be electrically connected to a three-phase AC power source or a three-phase AC load having a U phase, a V phase, and a W phase. The converter circuit (4) is electrically connected to the AC terminals (T21, T22, T23). The converter circuit (4) includes the U-phase circuit (41), the V-phase circuit (42), and the W-phase circuit (43) corresponding to the U phase, the V phase, and the W phase in one-to-one correspondence. The U-phase circuit (41) includes the high potential-side switch (Q5) and the low potential-side switch (Q6), which are electrically connected in series. The V-phase circuit (42) includes the high potential-side switch (Q7) and the low potential-side switch (Q8), which are electrically connected in series. The W-phase circuit (43) includes the high potential-side switch (Q9) and the low potential-side switch (Q10), which are electrically connected in series. The control circuit (6) controls, through use of the PWM signals, the high potential-side switches (Q5, Q7, Q9) for the U-phase circuit (41), the V-phase circuit (42), and the W-phase circuit (43), respectively. The control circuit (6) alternately switches between the first modulation method and the second modulation method at each half carrier period of the PWM signals. In the first modulation method, the control circuit (6) determines, as the first value, the duty ratio of the PWM signal for one of the U phase, the V phase, and the W phase that has the maximum phase voltage. In the second modulation method, the control circuit (6) determines, as the second value, the duty ratio of the PWM signal for one of the U phase, the V phase, and the W phase that has the minimum phase voltage.

According to the first aspect, a period during which the duty ratio of the PWM signal for one of the U phase, the V phase, and the W phase that has the maximum phase voltage is fixedly determined and a period during which the duty ratio of the PWM signal for one of the U phase, the V phase, and the W phase that has the minimum phase voltage is fixedly determined repeatedly alternate at each half carrier period. By controlling the converter circuit (4) through use of such a modulation method, the power conversion system (1, 1A) can reduce the waveform distortion of an output waveform when power conversion is performed between a direct current and a three-phase alternating current.

The power conversion system (1, 1A) according to a second aspect of this disclosure is the power conversion system (1, 1A) according to the first aspect in which each of the first value and the second value is a fixed value.

According to the second aspect, at each half carrier period, the duty ratio of the PWM signal for one of the U phase, the V phase, and the W phase that has the maximum phase voltage or the duty ratio of the PWM signal for one of the U phase, the V phase, and the W phase that has the minimum phase voltage is alternately set to the fixed value. Accordingly, when power conversion is performed between a direct current and a three-phase alternating current, the waveform distortion of the output waveform can further be reduced.

The power conversion system (1, 1A) according to a third aspect of this disclosure is the power conversion system (1, 1A) according to the first or second aspect in which, in the first modulation method, the control circuit (6) determines the duty ratios of the PWM signals for two of the U phase, the V phase, and the W phase that do not have the maximum phase voltage based on the phase voltages. In the second modulation method, the control circuit (6) determines the duty ratios of the PWM signals for two of the U phase, the V phase, and the W phase that do not have the minimum phase voltage based on the phase voltages.

According to the third aspect, at each half carrier period, the duty ratios of the PWM signals for two of the U phase, the V phase, and the W phase that do not have the maximum phase voltage or the duty ratios of the PWM signals for two of the U phase, the V phase, and the W phase that do not have the minimum phase voltage is alternately set to the variable value. Accordingly, when power conversion is performed between a direct current and a three-phase alternating current, the waveform distortion of the output waveform can further be reduced.

The power conversion system (1, 1A) according to a fourth aspect of this disclosure is the power conversion system (1, 1A) according to any one of the first to third aspects in which the first value is larger than any of the duty ratios of the PWM signals for two of the U phase, the V phase, and the W phase that do not have the maximum phase voltage in the first modulation method.

According to the fourth aspect, in the first modulation method, the duty ratio of the PWM signal for one of the U phase, the V phase, and the W phase that has the maximum phase voltage is set relatively high. Accordingly, when power conversion is performed between a direct current and a three-phase alternating current, the waveform distortion of the output waveform can further be reduced.

The power conversion system (1, 1A) according to a fifth aspect of this disclosure is the power conversion system (1, 1A) according to any one of the first to fourth aspects in which the second value is smaller than any of the duty ratios of the PWM signals for two of the U phase, the V phase, and the W phase that do not have the minimum phase voltage in the second modulation method.

According to the fifth aspect, in the second modulation method, the duty ratio of the PWM signal for one of the U phase, the V phase, and the W phase that has the minimum phase voltage is set relatively low. Accordingly, when power conversion is performed between a direct current and a three-phase alternating current, the waveform distortion of the output waveform can further be reduced.

The power conversion system (1) according to a sixth aspect of this disclosure is the power conversion system (1) according to any one of the first to fifth aspects which further includes the transformer circuit portion (2) and the connection portion (3). The transformer circuit portion (2) includes a primary winding (231) and a secondary winding (232) magnetically coupled to each other, the first converter portion (21), and the second converter portion (22). The first converter portion (21) is electrically connected between the DC terminal (T12) and the primary winding (231). The second converter portion (22) is electrically connected to the secondary winding (232). The connection portion (3) includes the first connection terminal (P3) and the second connection terminal (N3) each configured to electrically connect the second converter portion (22) and the converter circuit (4). The control circuit (6) controls the first converter portion (21) such that positive and negative voltages are alternately applied to the primary winding (231). The control circuit (6) controls the second converter portion (22) such that the voltage of the first connection terminal (P3) with respect to that of the second connection terminal (N3) is positive.

According to the sixth aspect, in the insulated power conversion system including the transformer circuit portion (2), when power conversion is performed between a direct current and a three-phase alternating current, the waveform distortion of the output waveform can be reduced. In addition, in the transformer circuit portion (2), imbalance between positive and negative excitation currents can be suppressed, and so-called uneven polarization is less likely to occur.

The power conversion system (1) according to a seventh aspect of this disclosure is the power conversion system (1) according to the sixth aspect in which the control circuit (6) controls the converter circuit (4) such that, during the first period (T1), power is not transferred between the transformer circuit portion (2) and the converter circuit (4). The first period (T1) includes the inversion period (Td1) during which the polarity of the voltage applied to the primary winding (231) is inverted. The polarity of the voltage applied to the primary winding (231) is inverted at each half carrier period of the PWM signal. The first modulation method and the second modulation method are switched during the inversion period (Td1).

According to the seventh aspect, when power conversion is performed between a direct current and a three-phase alternating current, the waveform distortion of the output waveform can further be reduced. In addition, in the transformer circuit portion (2), imbalance between positive and negative excitation currents can be suppressed, and so-called uneven polarization is much less likely to occur.

The power conversion system (1) according to an eighth aspect of this disclosure is the power conversion system (1) according to the sixth or seventh aspect in which the control circuit (6) controls the converter circuit (4) such that, during the first period (T1), power is not transferred between the transformer circuit portion (2) and the converter circuit (4). The first period length is equal to or longer than the second period length. The first period length corresponds to the length of the period from the start point of the first period (T1) to the start point of the inversion period (Td1). The second period length corresponds to the length of the period from the end point of the inversion period (Td1) to the end point of the first period (T1).

According to the eighth aspect, when power conversion is performed between a direct current and a three-phase alternating current, the waveform distortion of the output waveform can be reduced. In addition, in the transformer circuit portion (2), imbalance between positive and negative excitation currents can be suppressed, and so-called uneven polarization is less likely to occur.

The power conversion system (1) according to a ninth aspect of this disclosure is the power conversion system (1) according to the eighth aspect in which, at least when the DC voltage applied to each of the DC terminals (T11, T12) has a maximum value within a rated operation range, the first period length is equal to or longer than the second period length.

According to the ninth aspect, when power conversion is performed between a direct current and a three-phase alternating current, the waveform distortion of the output waveform can be reduced. In addition, in the transformer circuit portion (2), imbalance between positive and negative excitation currents can be suppressed, and so-called uneven polarization is less likely to occur.

The configurations according to the second to ninth aspects are not essential to the power conversion system (1, 1A) and can appropriately be omitted.

INDUSTRIAL APPLICABILITY

According to this disclosure, the power conversion system is useful not only to a power conditioner, but also to various electronic devices.

REFERENCE SIGNS LIST 1, 1A power conversion system
2 transformer circuit portion
3 connection portion
4 converter circuit
6 control circuit
21 first converter portion
22 second converter portion
41 U-phase circuit
42 V-phase circuit
43 W-phase circuit
231 primary winding
232 secondary winding
N3 terminal (second connection terminal)
P3 terminal (first connection terminal)
Q5, Q7, Q9 higher potential switch
Q6, Q8, Q10 higher potential switch
Sig5, Sig7, Sig9 drive signal (PWM signal)
T1 first period
T11, T12 DC terminal
T21, T22, T23 AC terminal
Td1 inversion period

The invention claimed is:

1. A power conversion system, which is configured to perform power conversion between a DC terminal to be electrically connected to a DC power source or a DC load and AC terminals to be electrically connected to a three-phase AC power source or a three-phase AC load having a U phase, a V phase, and a W phase, the power conversion system comprising:

a converter circuit electrically connected to the AC terminals, the converter circuit including a U-phase circuit, a V-phase circuit, and a W-phase circuit, which correspond to the U phase, the V phase, and the W phase in one-to-one correspondence and each of which includes a high potential-side switch and a low potential-side switch electrically connected in series; and a control circuit configured to control, for each of the U-phase circuit, the V-phase circuit, and the W-phase circuit, the high potential-side switch through use of a PWM signal, wherein the control circuit is configured to:
apply a first modulation method to a first half of a carrier period of a carrier signal for generating the PWM signal and apply a second modulation method to a second half of the carrier period to alternately switch between the first modulation method and the second modulation method at each half carrier period of the PWM signal, wherein the first half of the carrier period of the carrier signal and the second half of the carrier period of the carrier signal constitute one full period of the carrier period of the carrier signal;

determine, in the first modulation method, as a first value, a duty ratio of the PWM signal for one of the U phase, the V phase, and the W phase that has a maximum phase voltage; and determine, in the second modulation method, as a second value, a duty ratio of the PWM signal for one of the U phase, the V phase, and the W phase that has a minimum phase voltage, and the power conversion system further comprises:
a transformer circuit portion including a primary winding and a secondary winding magnetically coupled to each other, a first converter portion electrically connected between the DC terminal and the primary winding, and a second converter portion electrically connected to the secondary winding; and a connection portion including a first connection terminal and a second connection terminal each configured to electrically connect the second converter portion and the converter circuit, the control circuit is configured to:
control the first converter portion such that a positive voltage and a negative voltage are alternately applied to the primary winding; and control the second converter portion such that a voltage of the first connection terminal is positive with respect to a voltage of the second connection terminal, and the control circuit is configured to control the converter circuit such that, during a first period including an inversion period during which a polarity of the voltage applied to the primary winding is inverted, power is inhibited from being transferred between the transformer circuit portion and the converter circuit.

2. The power conversion system according to claim 1, wherein each of the first value and the second value is a fixed value.

3. The power conversion system according to claim 1, wherein the control circuit is configured to:
in the first modulation method, determine the duty ratios of the PWM signals for remaining two phases based on the phase voltages, the remaining two phases being two of the U phase, the V phase, and the W phase and other than the one of the U phase, the V phase, and the W phase that has the maximum phase voltage; and in the second modulation method, determine the duty ratios of the PWM signal for remaining two phases based on the phase voltages, the remaining two phases being two of the U phase, the V phase, and the W phase and other than the one of the U phase, the V phase, and the W phase that has the minimum phase voltage.

4. The power conversion system according to claim 1, wherein the first value is larger than any of the duty ratios of the PWM signals for two of the U phase, the V phase, and the W phase other than one of the U phase, the V phase, and the W phase that has the maximum phase voltage in the first modulation method.

5. The power conversion system according to claim 1, wherein the second value is smaller than any of the duty ratios of the PWM signals for two of the U phase, the V phase, and the W phase other than one of the U phase, the V phase, and the W phase that has the minimum phase voltage in the second modulation method.

6. The power conversion system according to claim 1, wherein the polarity of the voltage applied to the primary winding is inverted at the each half carrier period of the PWM signal, and
wherein the first modulation method and the second modulation method are switched during the inversion period.

7. The power conversion system according to claim 1, wherein a first period length, which is a length of a period from a start point of the first period to a start point of the inversion period, is equal to or longer than a second period length, which is a length of a period from an end point of the inversion period to an end point of the first period.

8. The power conversion system according to claim 7, wherein, at least when a DC voltage applied to the DC terminal has a maximum value within a rated operation range, the first period length is equal to or longer than the second period length.

9. A power conversion system, which is configured to perform power conversion between a DC terminal to be electrically connected to a DC power source or a DC load and AC terminals to be electrically connected to a three-phase AC power source or a three-phase AC load having a U phase, a V phase, and a W phase, the power conversion system comprising:
  a converter circuit electrically connected to the AC terminals, the converter circuit including a U-phase circuit, a V-phase circuit, and a W-phase circuit, which correspond to the U phase, the V phase, and the W phase in one-to-one correspondence and each of which includes a high potential-side switch and a low potential-side switch electrically connected in series;
  a transformer circuit portion including a primary winding and a secondary winding magnetically coupled to each other, a first converter portion electrically connected between the DC terminal and the primary winding, and a second converter portion electrically connected to the secondary winding;
  a connection portion including a first connection terminal and a second connection terminal each configured to electrically connect the second converter portion and the converter circuit; and
  a control circuit configured to control, for each of the U-phase circuit, the V-phase circuit, and the W-phase circuit, the high potential-side switch through use of a PWM signal,
  wherein the control circuit is configured to:
    alternately switch between a first modulation method and a second modulation method at each half carrier period of the PWM signal;
    determine, in the first modulation method, as a first value, a duty ratio of the PWM signal for one of the U phase, the V phase, and the W phase that has a maximum phase voltage;
    determine, in the second modulation method, as a second value, a duty ratio of the PWM signal for one of the U phase, the V phase, and the W phase that has a minimum phase voltage;
    control the first converter portion such that a positive voltage and a negative voltage are alternately applied to the primary winding; and
    control the second converter portion such that a voltage of the first connection terminal is positive with respect to a voltage of the second connection terminal,
  the control circuit is configured to control the converter circuit such that, during a first period including an inversion period during which a polarity of the voltage applied to the primary winding is inverted, power is inhibited from being transferred between the transformer circuit portion and the converter circuit,
  the polarity of the voltage applied to the primary winding is inverted at the each half carrier period of the PWM signal, and
  the first modulation method and the second modulation method are switched during the inversion period.

10. The power conversion system according to claim 9, wherein each of the first value and the second value is a fixed value.

11. The power conversion system according to claim 9, wherein the control circuit is configured to:
  in the first modulation method, determine the duty ratios of the PWM signals for remaining two phases based on the phase voltages, the remaining two phases being two of the U phase, the V phase, and the W phase and other than the one of the U phase, the V phase, and the W phase that has the maximum phase voltage; and
  in the second modulation method, determine the duty ratios of the PWM signal for remaining two phases based on the phase voltages, the remaining two phases being two of the U phase, the V phase, and the W phase and other than the one of the U phase, the V phase, and the W phase that has the minimum phase voltage.

12. The power conversion system according to claim 9, wherein the first value is larger than any of the duty ratios of the PWM signals for two of the U phase, the V phase, and the W phase other than one of the U phase, the V phase, and the W phase that has the maximum phase voltage in the first modulation method.

13. The power conversion system according to claim 9, wherein the second value is smaller than any of the duty ratios of the PWM signals for two of the U phase, the V phase, and the W phase other than one of the U phase, the V phase, and the W phase that has the minimum phase voltage in the second modulation method.

14. A power conversion system, which is configured to perform power conversion between a DC terminal to be electrically connected to a DC power source or a DC load and AC terminals to be electrically connected to a three-phase AC power source or a three-phase AC load having a U phase, a V phase, and a W phase, the power conversion system comprising:
  a converter circuit electrically connected to the AC terminals, the converter circuit including a U-phase circuit, a V-phase circuit, and a W-phase circuit, which correspond to the U phase, the V phase, and the W phase in one-to-one correspondence and each of which includes a high potential-side switch and a low potential-side switch electrically connected in series;

a transformer circuit portion including a primary winding and a secondary winding magnetically coupled to each other, a first converter portion electrically connected between the DC terminal and the primary winding, and a second converter portion electrically connected to the secondary winding;

a connection portion including a first connection terminal and a second connection terminal each configured to electrically connect the second converter portion and the converter circuit; and a control circuit configured to control, for each of the U-phase circuit, the V-phase circuit, and the W-phase circuit, the high potential-side switch through use of a PWM signal, wherein the control circuit is configured to:

alternately switch between a first modulation method and a second modulation method at each half carrier period of the PWM signal;

determine, in the first modulation method, as a first value, a duty ratio of the PWM signal for one of the U phase, the V phase, and the W phase that has a maximum phase voltage;

determine, in the second modulation method, as a second value, a duty ratio of the PWM signal for one of the U phase, the V phase, and the W phase that has a minimum phase voltage;

control the first converter portion such that a positive voltage and a negative voltage are alternately applied to the primary winding; and control the second converter portion such that a voltage of the first connection terminal is positive with respect to a voltage of the second connection terminal, the control circuit is configured to control the converter circuit such that, during a first period including an inversion period during which a polarity of the voltage applied to the primary winding is inverted, power is inhibited from being transferred between the transformer circuit portion and the converter circuit, and a first period length, which is a length of a period from a start point of the first period to a start point of the inversion period, is equal to or longer than a second period length, which is a length of a period from an end point of the inversion period to an end point of the first period.

15. The power conversion system according to claim 14, wherein each of the first value and the second value is a fixed value.

16. The power conversion system according to claim 14, wherein the control circuit is configured to:

in the first modulation method, determine the duty ratios of the PWM signals for remaining two phases based on the phase voltages, the remaining two phases being two of the U phase, the V phase, and the W phase and other than the one of the U phase, the V phase, and the W phase that has the maximum phase voltage; and in the second modulation method, determine the duty ratios of the PWM signal for remaining two phases based on the phase voltages, the remaining two phases being two of the U phase, the V phase, and the W phase and other than the one of the U phase, the V phase, and the W phase that has the minimum phase voltage.

17. The power conversion system according to claim 14, wherein the first value is larger than any of the duty ratios of the PWM signals for two of the U phase, the V phase, and the W phase other than one of the U phase, the V phase, and the W phase that has the maximum phase voltage in the first modulation method.

18. The power conversion system according to claim 14, wherein the second value is smaller than any of the duty ratios of the PWM signals for two of the U phase, the V phase, and the W phase other than one of the U phase, the V phase, and the W phase that has the minimum phase voltage in the second modulation method.

* * * * *